US011304408B2

United States Patent
Cooke et al.

(10) Patent No.: US 11,304,408 B2
(45) Date of Patent: Apr. 19, 2022

(54) LEASH ATTACHMENT

(71) Applicant: Tail Chasers LLC, Highlands Ranch, CO (US)

(72) Inventors: Kerry Cooke, Carlsbad, CA (US); Ian Kovacevich, Carlsbad, CA (US); Kassie Betts, San Diego, CA (US); Nouphone Bansasine, San Diego, CA (US)

(73) Assignee: Tail Chasers LLC, Highlands Ranch, CO (US)

(*) Notice: Subject to any disclaimer, the term of this patent is extended or adjusted under 35 U.S.C. 154(b) by 247 days.

(21) Appl. No.: 16/813,499

(22) Filed: Mar. 9, 2020

(65) Prior Publication Data

US 2021/0137077 A1 May 13, 2021

Related U.S. Application Data

(60) Provisional application No. 62/954,980, filed on Dec. 30, 2019, provisional application No. 62/933,394, filed on Nov. 9, 2019.

(51) Int. Cl.
*A01K 27/00* (2006.01)
*A01K 7/02* (2006.01)

(52) U.S. Cl.
CPC .......... *A01K 27/008* (2013.01); *A01K 27/004* (2013.01); *A01K 7/025* (2013.01)

(58) Field of Classification Search
CPC ............................ A01K 27/008; A01K 27/004
See application file for complete search history.

(56) References Cited

U.S. PATENT DOCUMENTS

| 9,137,972 | B2 | 9/2015 | Orubor |
| 9,232,772 | B1 | 1/2016 | Majcen et al. |
| 9,398,756 | B2 | 7/2016 | Eckert |
| 10,231,434 | B2 | 3/2019 | Eckert |
| 2008/0173257 | A1 | 7/2008 | Steiner et al. |
| 2010/0018468 | A1* | 1/2010 | Rabello ................ A01K 27/004 119/61.56 |
| 2010/0206246 | A1 | 8/2010 | Waldrep |
| 2011/0120387 | A1 | 5/2011 | Warkentin |
| 2011/0139090 | A1 | 6/2011 | Harruna |
| 2012/0137978 | A1 | 6/2012 | McBounds |
| 2013/0000566 | A1 | 1/2013 | Berton |
| 2015/0196010 | A1 | 7/2015 | Orubor |
| 2015/0373949 | A1 | 12/2015 | Eckert |

OTHER PUBLICATIONS

International Search Report and Written Opinion dated Feb. 10, 2021 for PCT/US2020/059454,11 pages.

* cited by examiner

*Primary Examiner* — Jessica B Wong
(74) *Attorney, Agent, or Firm* — Torrey Pines Law Group, PC

(57) ABSTRACT

A leash attachment and method for using the leash attachment are provided. The leash attachment has a built-in flip open cup that allows an animal to drink from the flip open cup once liquid is expelled to the distal end of the cup via a nozzle. Unused liquid from the flip open cup drains back via a funnel into the leash attachment by way of a fill hole. The leash attachment attaches to a leash via a rolling cam with ridges on the cam's outer surface.

19 Claims, 25 Drawing Sheets

LEASH ATTACHMENT

CROSS-REFERENCE TO RELATED APPLICATIONS

Figure 1:
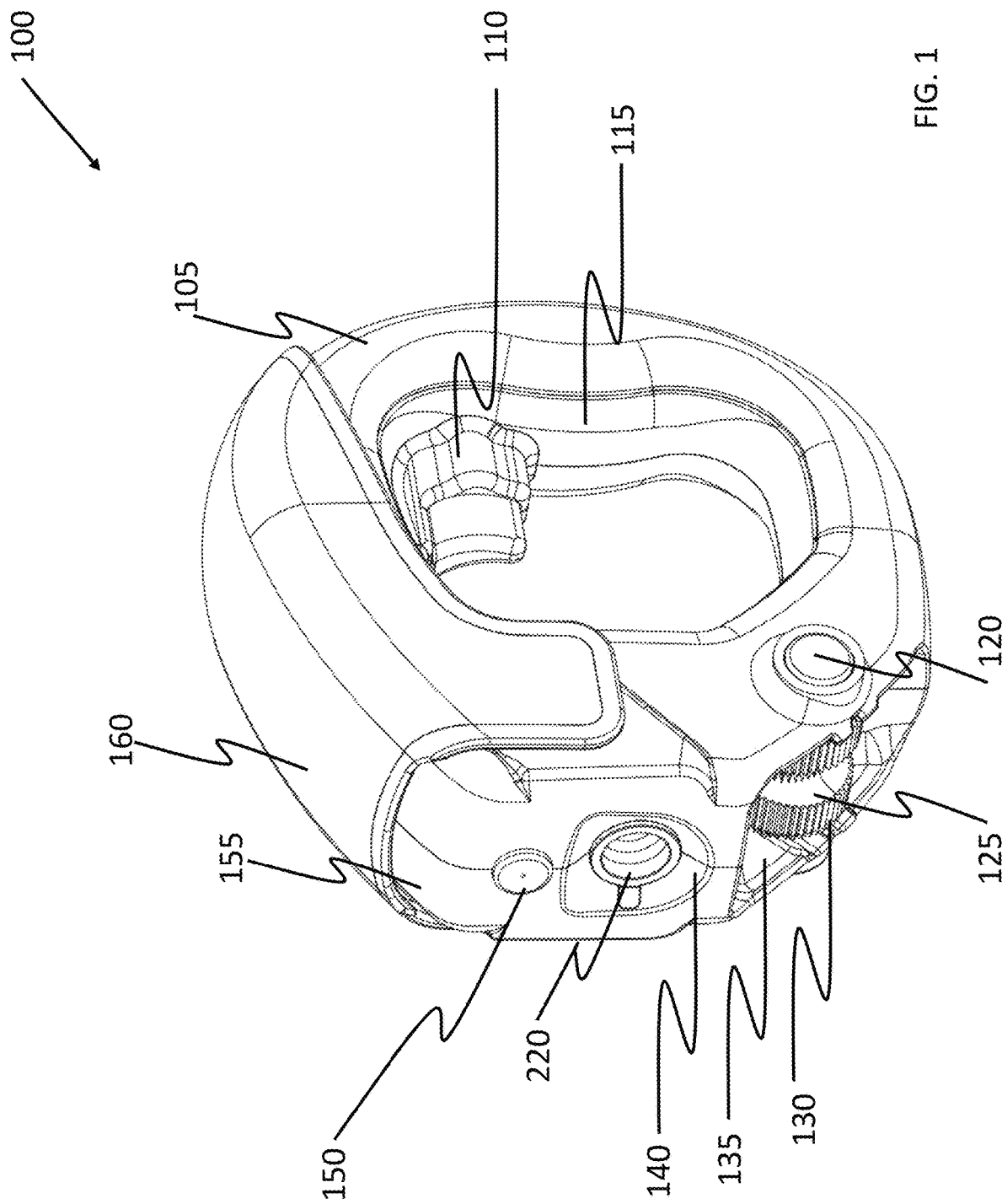

This application claims the benefit of U.S. Provisional Application No. 62/933,394, filed on Nov. 9, 2019, which is entitled "Leash Attachment" and U.S. Provisional Application No. 62/954,980, filed on Dec. 30, 2019, which is entitled "Leash Attachment" both of which are incorporated by reference herein in their entirety for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

FIELD

The present teachings relate to a leash attachment that expels liquid into a built-in cup for a leashed animal to drink from.

INTRODUCTION

Owning an animal that requires a leash is no small feat. There are many issues to consider when keeping such a pet, one of which is stopping for liquid breaks while out walking, which can be a nuisance.

While there are current devices that provide liquid to leashed animals, their usage can be cumbersome. An ergonomically designed and easy to use device that delivers liquid to leashed animals without the owner having to stop and fumble for an alternate device or solution is ideal. This leash attachment offers hydration for the leashed animal, providing an effective solution every pet owner can appreciate.

SUMMARY

The present teachings include a leash attachment that comprises a housing that has a top surface that is downwardly angled. Within the housing is a liquid reservoir that holds a liquid. A fill hole is also in the housing and allows liquid to be added to the reservoir. A flip open cup rests on the top surface of the housing. A first pair of detents, attached to the housing, keeps the flip open cup in the non-use, or closed position. In effect, the first pair of detents keeps the flip open cup from unwantedly swinging open and outward. A trigger is connected to a dispensing mechanism that expels the liquid. A leash connects to the leash attachment through the leash hole, with a cam that secures the leash in place. A second pair of detents keeps the cam in place. When pressed, the second pair of detents releases the cam from the leash attachment.

In accordance with a further aspect, the dispensing mechanism comprises a body and at least one straw. When there is liquid in the liquid reservoir, depressing or deploying the trigger aspirates or sucks liquid into the at least one straw, through the body, and out through a nozzle. The liquid travels through a first end of the at least one straw and exits through a second end of the at least one straw that is connected to the nozzle.

In accordance with yet another aspect, the housing comprises a grip that allows a user to easily grasp the leash attachment. The grip makes it easier to deploy the trigger while still holding the leash attachment.

In accordance with yet another aspect, the flip open cup swings outward to an open position. From the open position, the flip open cup can be filled by liquid coming from the nozzle.

In accordance with yet another aspect, the cam is a rolling structure that is positioned within the leash hole. A leash inserted through the leash hole rolls along ridges of the cam, securing the leash.

In accordance with yet another aspect, the top surface of the housing is angled downward. The angle downward is between 15 and 45 degrees in relation to the ground when the leash attachment is held by the user. The flip open cup rests on the angled portion of the housing when in the closed position, or when not in use.

Any type of leash, with the exception of chain link and retractable leashes, can be accommodated by the leash attachment as long as it fits through the leash hole. Leashes made of leather, nylon, or rope are all suitable. The leash attachment can remain on the leash or be easily removed from the leash.

In accordance with yet another aspect, the trigger is connected to the dispensing mechanism; a body and at least one straw comprise the dispensing mechanism. Depressing or deploying the trigger sucks liquid into a first end of the at least one straw, through the body and out through a second end of the at least one straw, which is connected to the nozzle. The liquid that exits the nozzle is expelled into the flip open cup when the flip open cup is in the open position. The liquid is expelled towards the distal end of the flip open cup (i.e. the part of the flip open cup farthest away from the user when the flip open cup is in the open position). The liquid exiting the nozzle can also be directed at the leashed animal, at another animal, or at the ground when the flip open cup is in the closed, or non-use, position.

In accordance with yet another aspect, the user fills the liquid reservoir with liquid through the fill hole. A cap covers the fill hole so liquid cannot leak through the fill hole.

In accordance with yet another aspect, leash attachment placement in relation to the leash is of critical importance. If the leash attachment is too close to the proximal end of the leash, i.e. the end of the leash held by the user, the leash attachment may obstruct the leash. If the leash attachment is too far away from the proximal end of the leash, there is too much leash between the proximal end of the leash and the leash attachment; the owner would have to carry the slack part of the leash, which may be cumbersome. There is an optimal range for the distance of the leash attachment from the proximal end of the leash. 6 inches plus or minus 2 inches is the optimal range. In essence, between 4 inches and 8 inches is the optimal distance between the leash attachment and the proximal end of the leash.

In accordance with yet another aspect, liquid exiting the nozzle is pointed towards the distal end of the flip open cup. This will allow the liquid to flow downward into the flip open cup when the cup is in the open position. Pointing the nozzle toward the proximal end of the flip open cup when dispensing liquid from the nozzle is of no use, since the flip open cup must be fully lowered to the open position for ease of use for the leashed animal. Not fully lowering the flip open cup makes it more difficult for the leash animal to drink from the flip open cup.

In accordance with yet another aspect, the cam secures the leash and locks the leash into place.

In accordance with yet another aspect, a funnel directs unused liquid in the flip open cup back through the fill hole back into the liquid reservoir.

In accordance with yet another aspect, a locating pin allows for easy assembly of the flip open cup to the leash attachment. The locating pin also allows the flip open cup to swing outwardly into the open position so that liquid can be expelled into the flip open cup.

In accordance with yet another aspect, the dispensing mechanism, comprising a body and at least one straw, is submersible within the liquid reservoir. In other words, the dispensing mechanism is fully within the liquid reservoir. Depending on the volume of liquid in the liquid reservoir, the dispensing mechanism may be fully submerged in liquid.

The present teachings also include methods for using the leash attachment with a leashed animal. The method of using the leash attachment involves placing the leash through the leash hole so that the cam can secure the leash, with the leash rolling along the ridges of the cam. The liquid reservoir is filled with a liquid through the fill hole and the cap is placed on the fill hole to prevent leakage from the fill hole. Swinging the flip open cup outward from the top surface is accomplished via the locating pin. Depressing the trigger allows liquid to travel through the at least one straw to the nozzle to be expelled. Expelled liquid is directed toward the distal end of the flip open cup so that it drains down into the flip open cup. Any unused liquid is directed to the funnel to be returned to the liquid reservoir via the fill hole, and the flip open cup is returned to the top surface.

The leash attachment has many uses. Its primary use is to provide liquid to leashed animals, allowing the animal owner to not have to carry a separate liquid bottle. The liquid exiting the nozzle can be also sprayed at the leashed animal to cool it or to redirect its attention and correct behavior. The liquid from the nozzle can be sprayed on the ground near the leashed animal's nose when it is spending too much time sniffing one spot during a walk or is distracted by another animal. The animal owner does not have to yank the leash to get the leashed animal's attention. Spraying other leashed or unleashed animals that approach the leashed animal is another use. The leash attachment can also be used to clean up messy paws or messy sidewalks by expelling liquid from the leash attachment onto the paws or ground. In addition, the leash attachment's grip provides a more comfortable feel to the user, allowing for better control of the leashed animal, especially if the leashed animal is energetic or large, as this type of animal tends to pull on the leash.

The leash attachment may be made by any conventional manufacturing method. Extrusion is a suitable method. Injection molding is another suitable method. Hard plastic or lightweight metal are appropriate materials for the leash attachment, with rubber being placed around the housing for easier handling and comfort. A portion of the inner surface of the housing, where the user's fingers grip the trigger, is textured to improve the user's grip and comfort while holding the leash attachment.

The reservoir may hold a considerable amount of liquid. 12 ounces of liquid may be accommodated in the liquid reservoir. The liquid reservoir may hold even more than 12 ounces of liquid by increasing the size of the housing. The leash attachment is able to be connected to exceptionally large animals. Indeed, animals of 200 pounds and up may be handled by the leash attachment, in addition to animals less than 200 pounds.

These and other features, aspects and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

Figure 2:
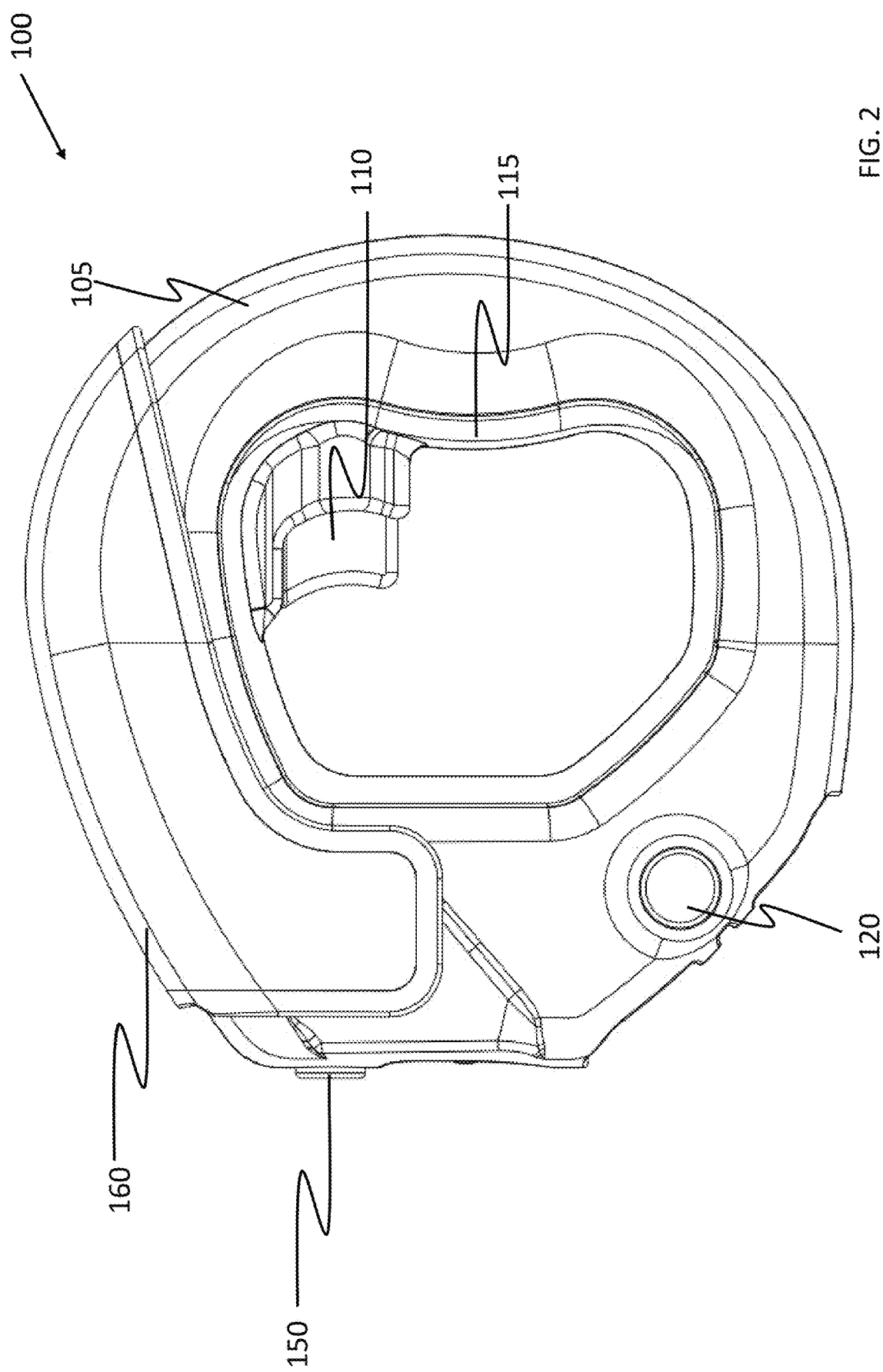
Figure 3:
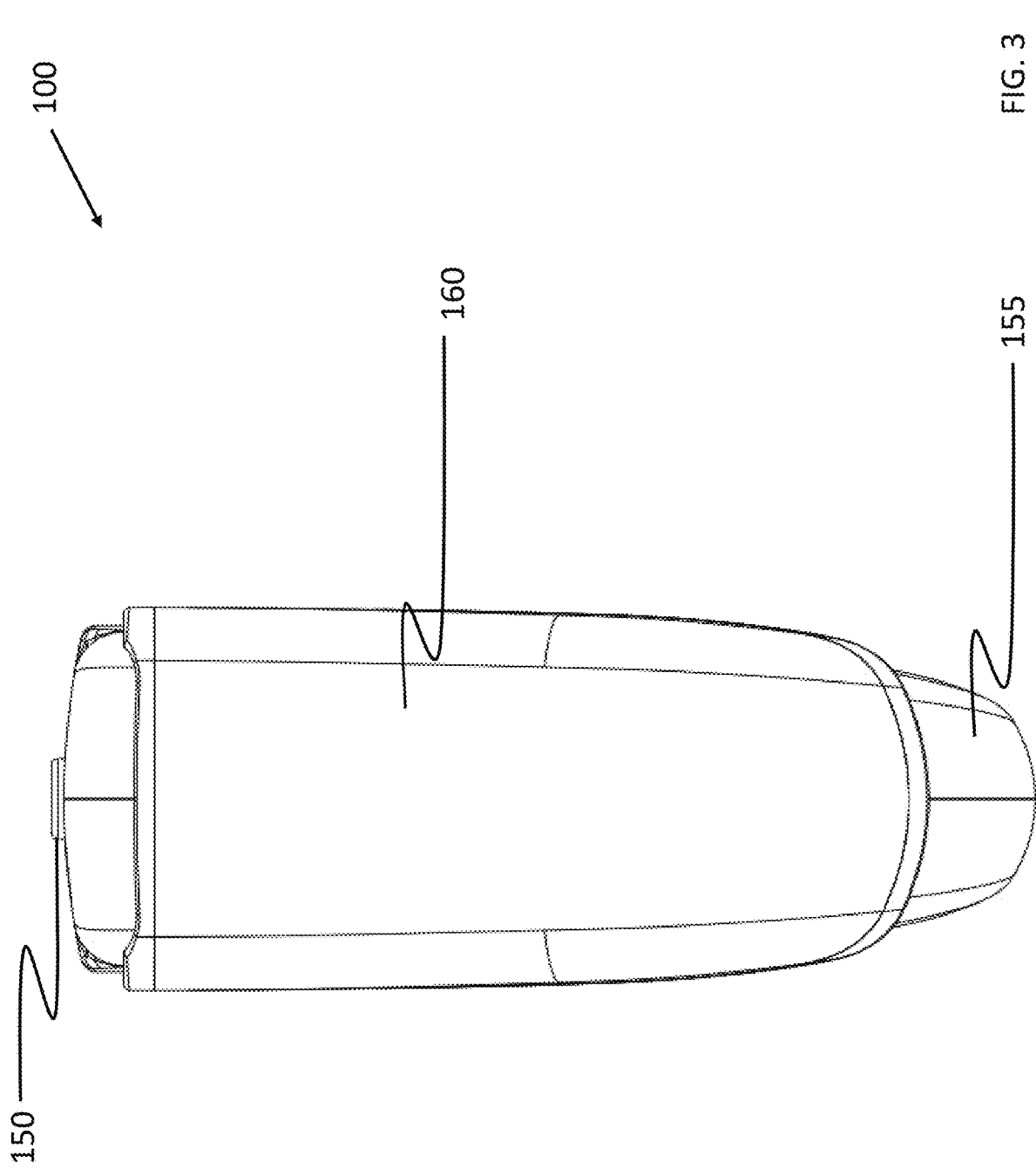
Figure 4:
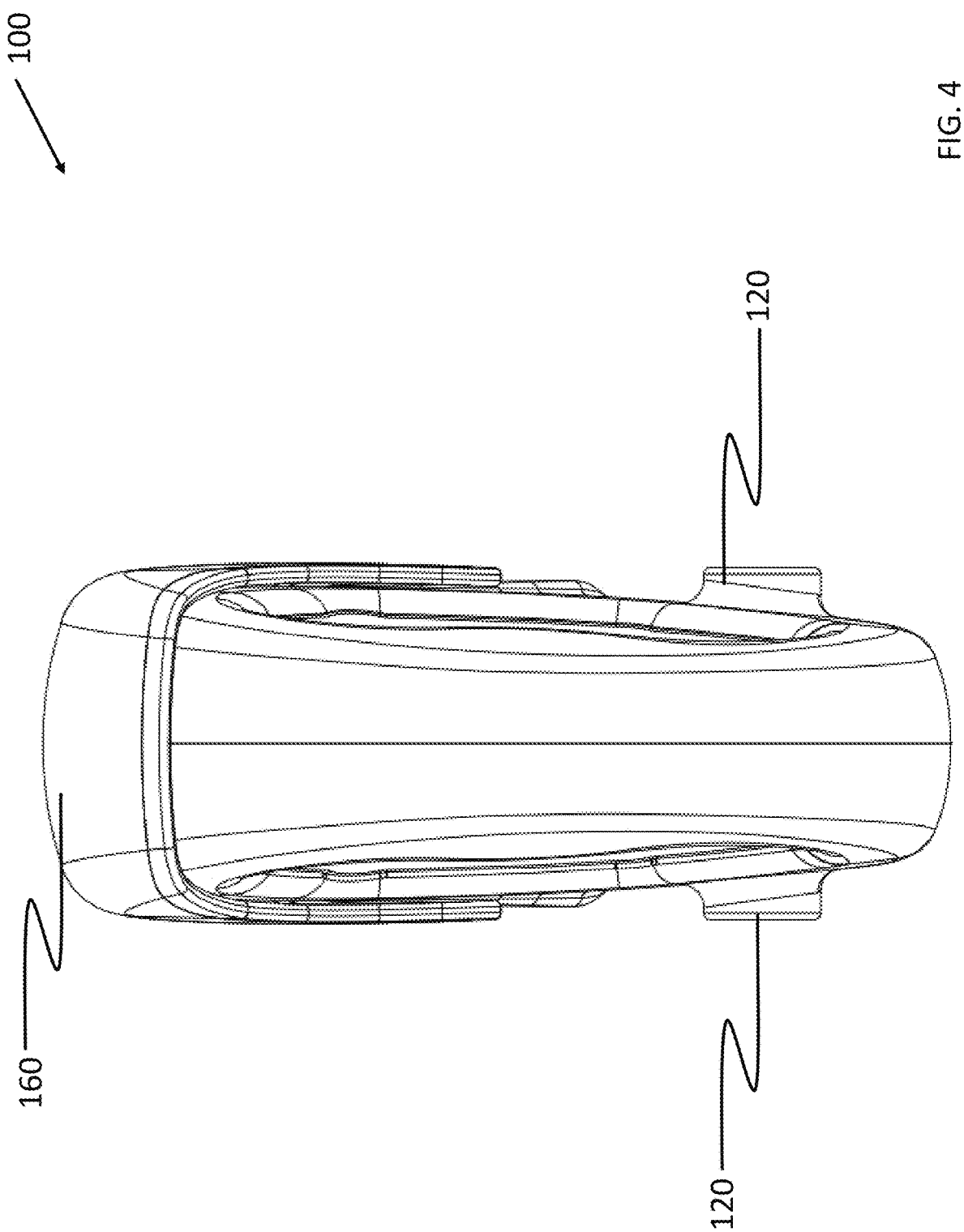
Figure 5:
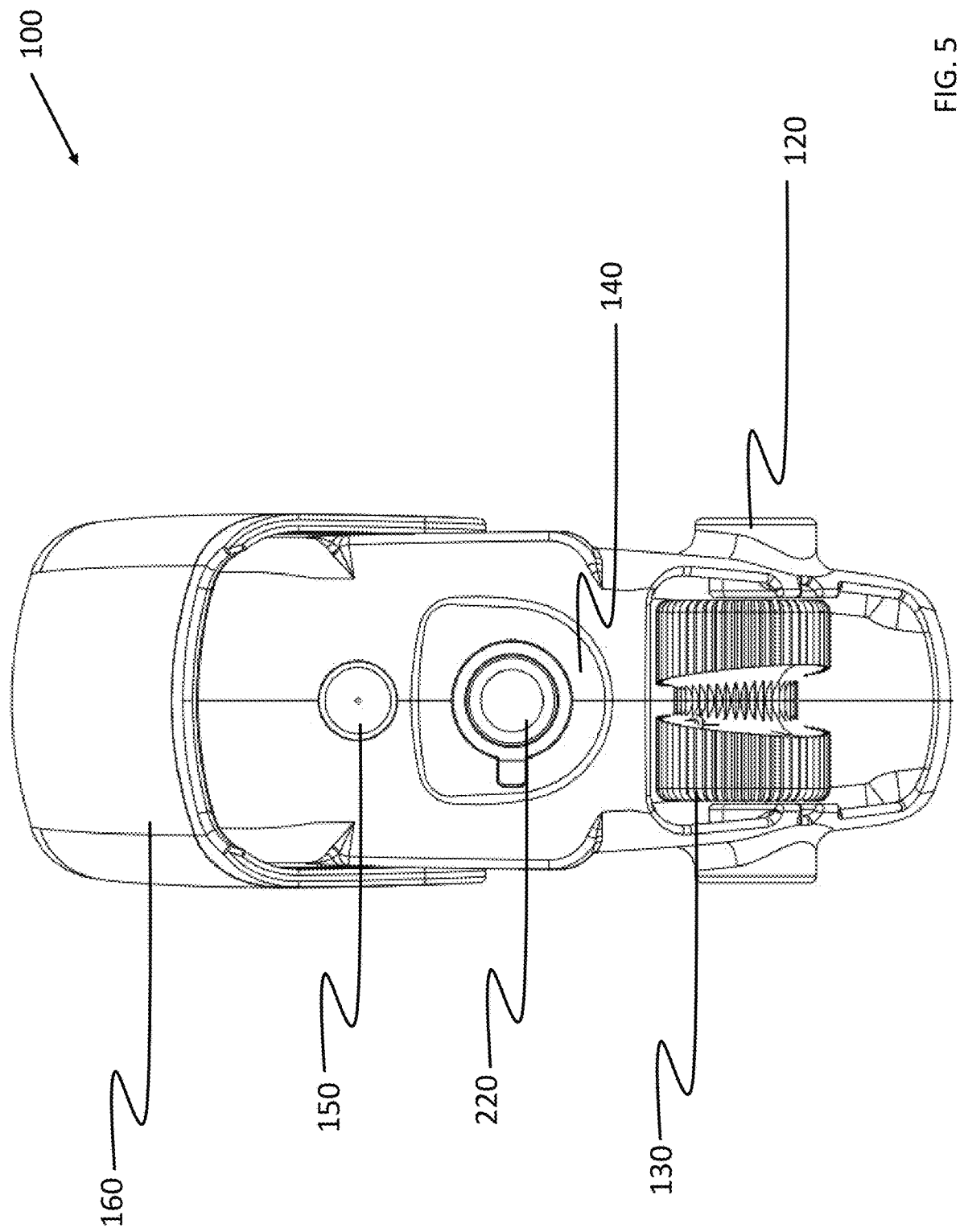
Figure 6:
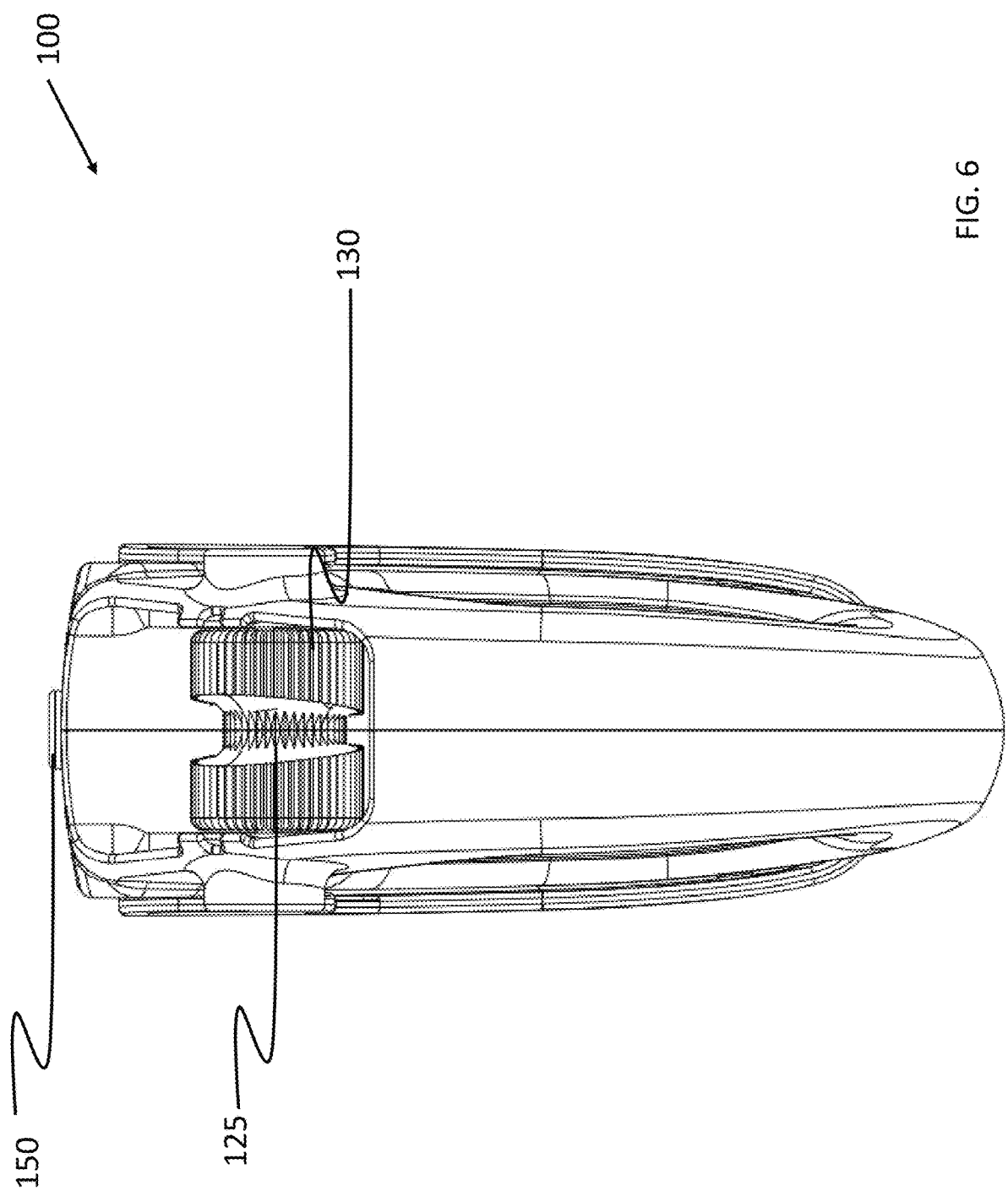
Figure 7:
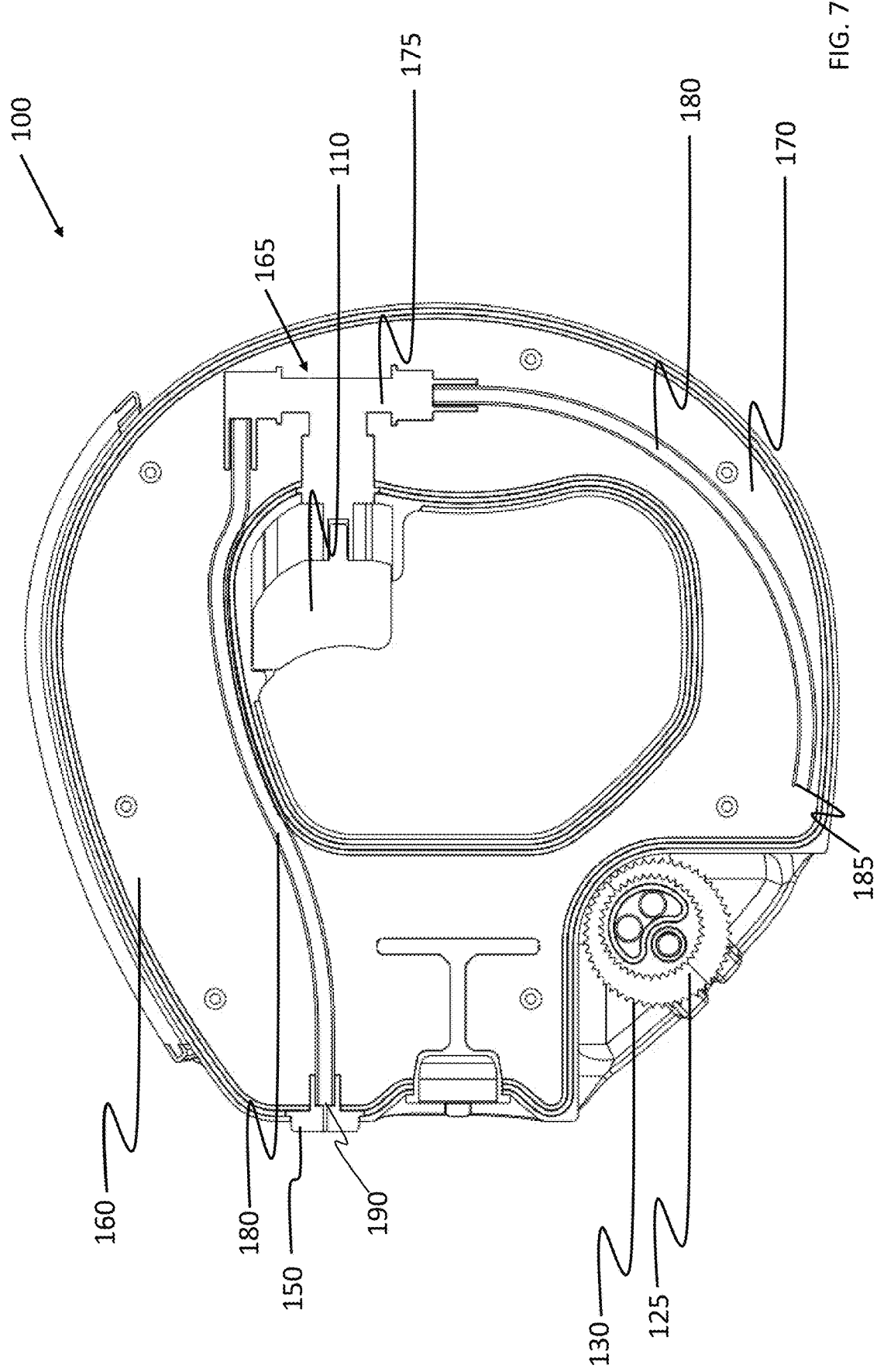
Figure 8:
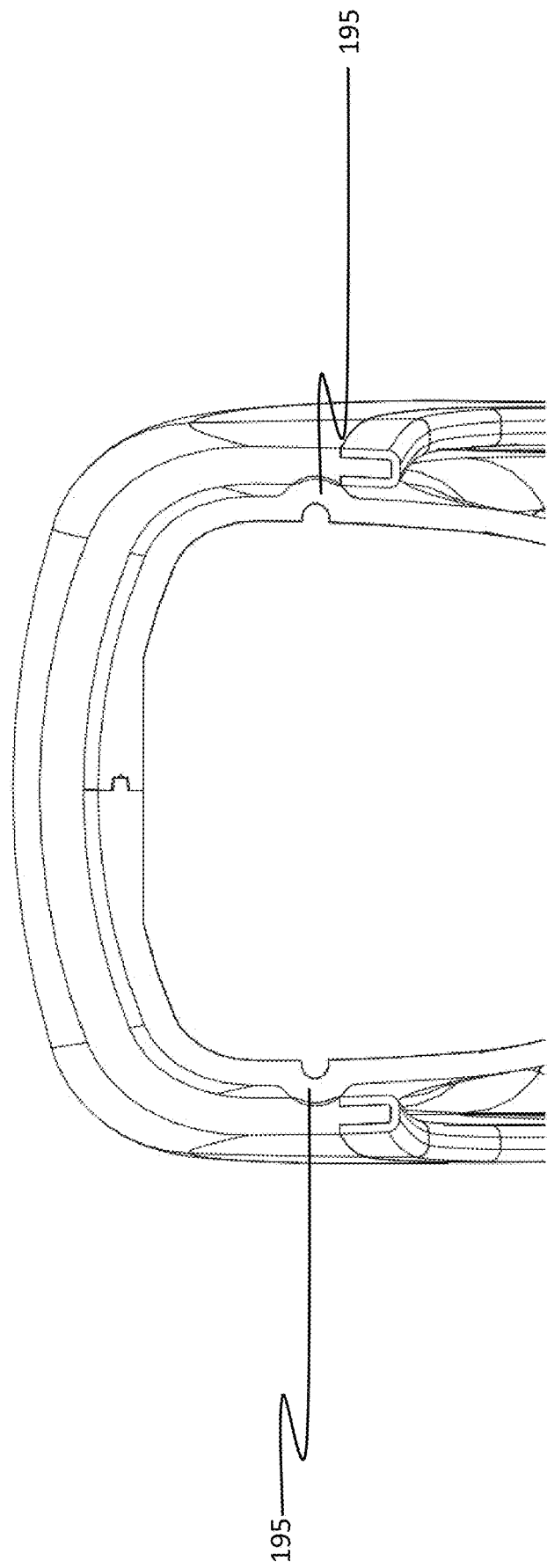
Figure 9:
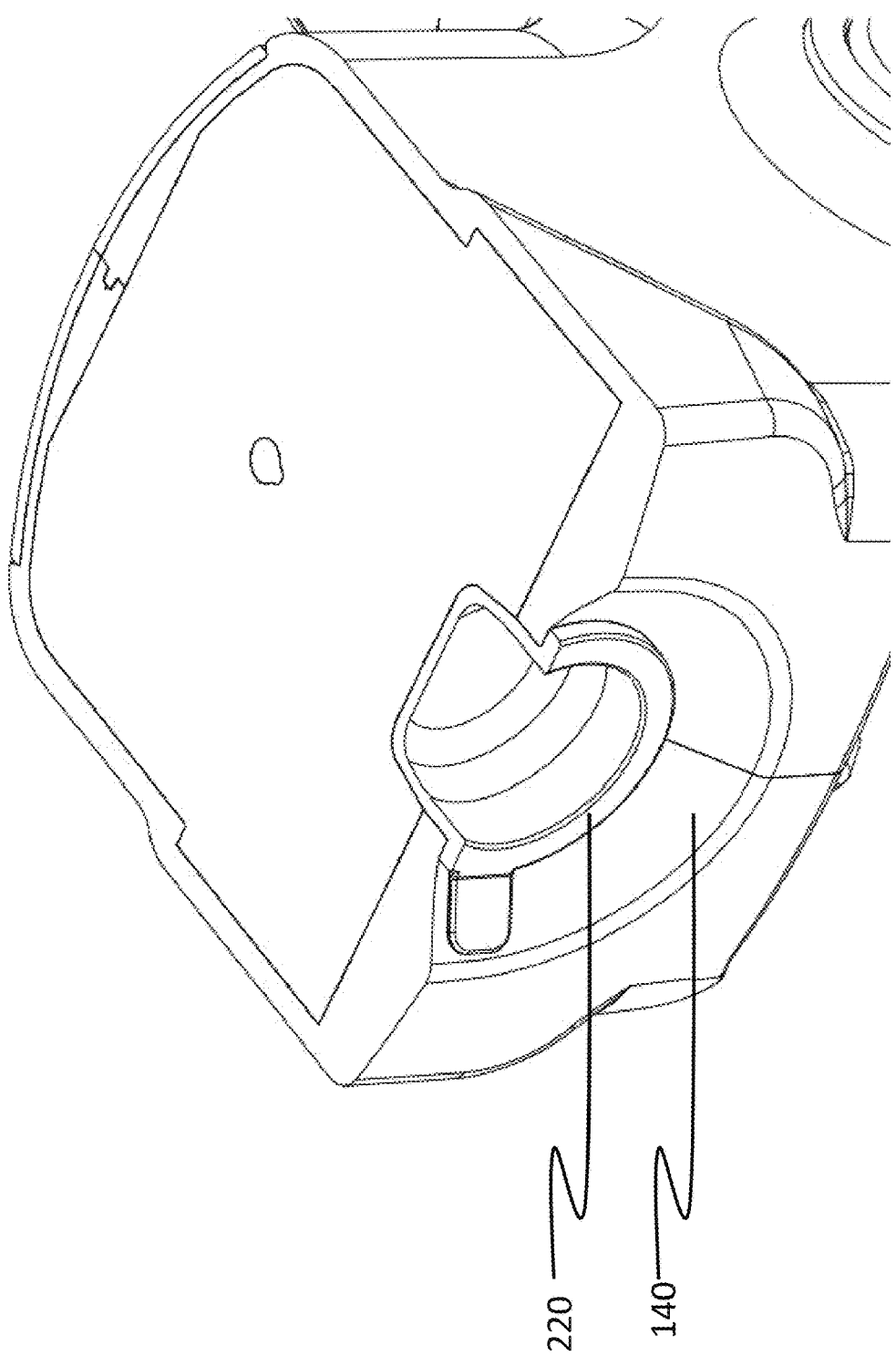
Figure 10:
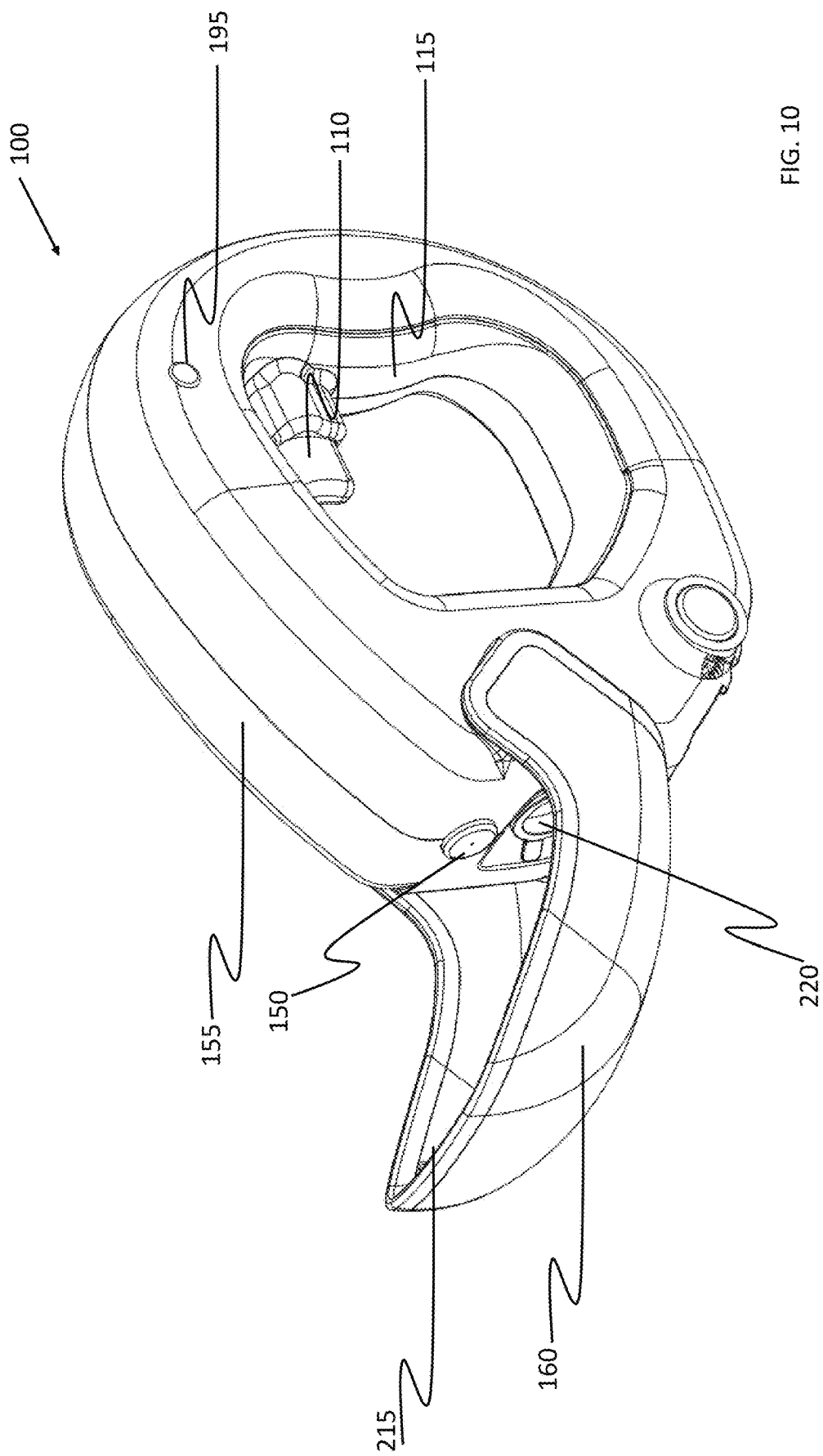
Figure 11:
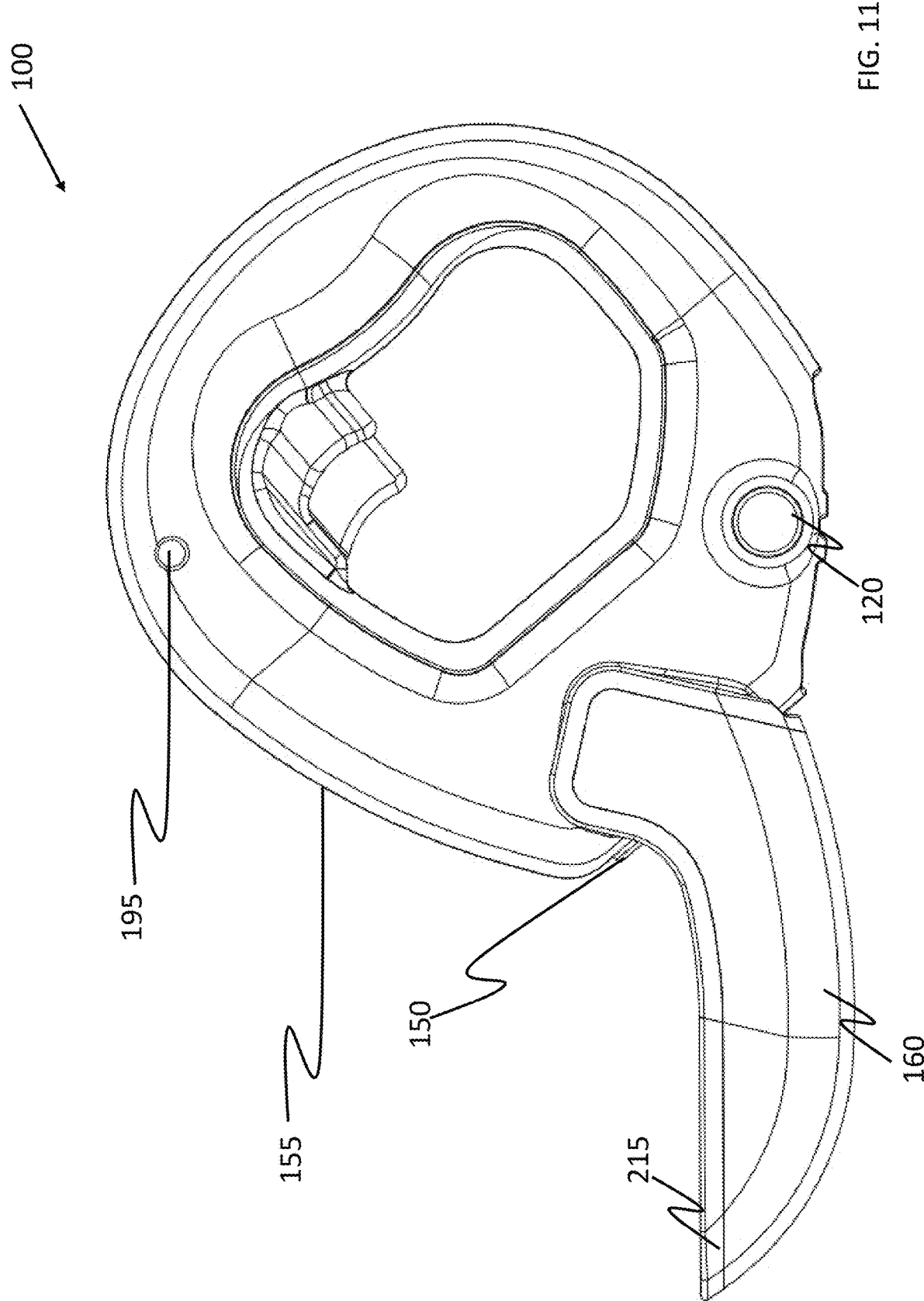
Figure 12:
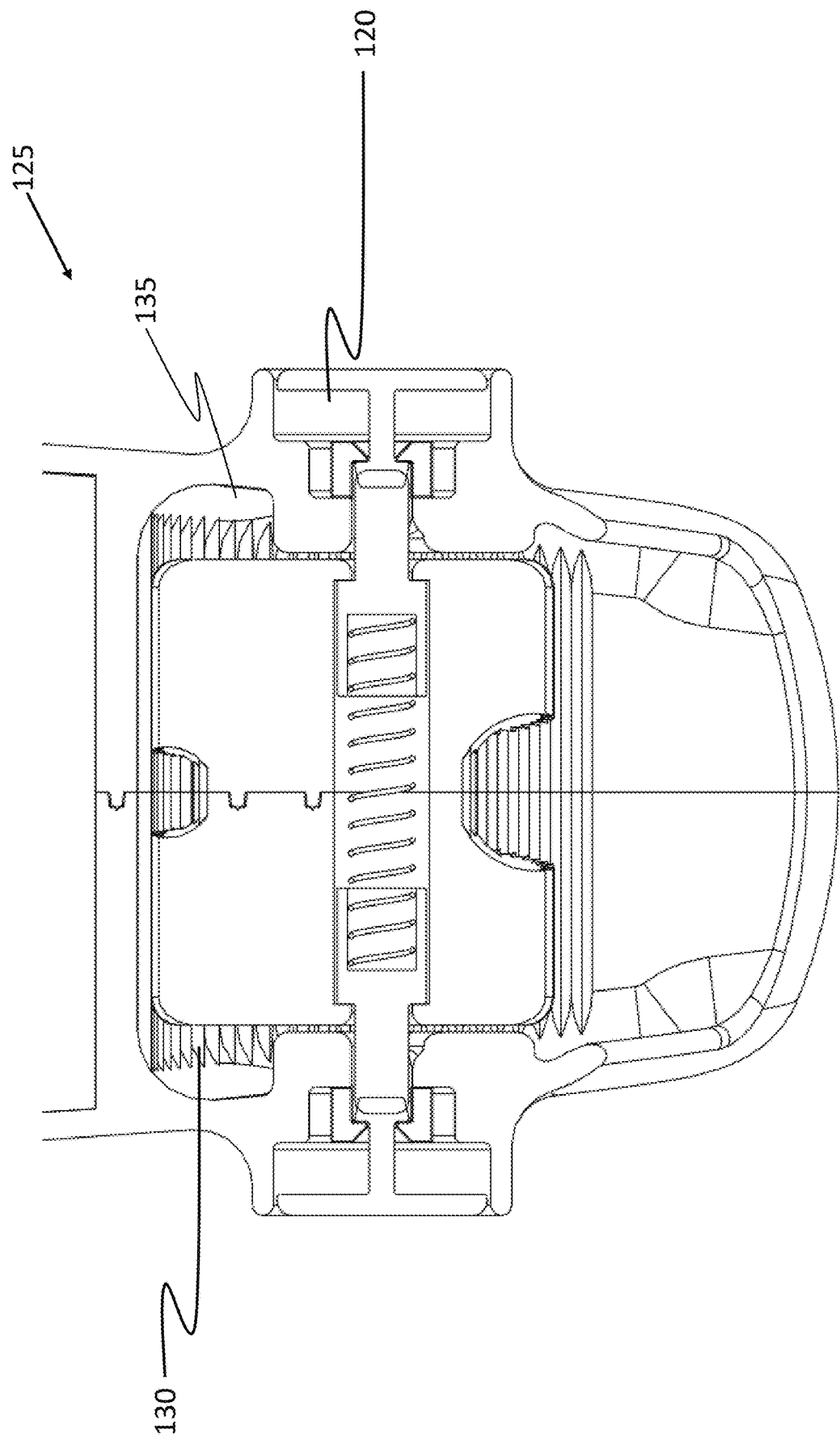
Figure 13:
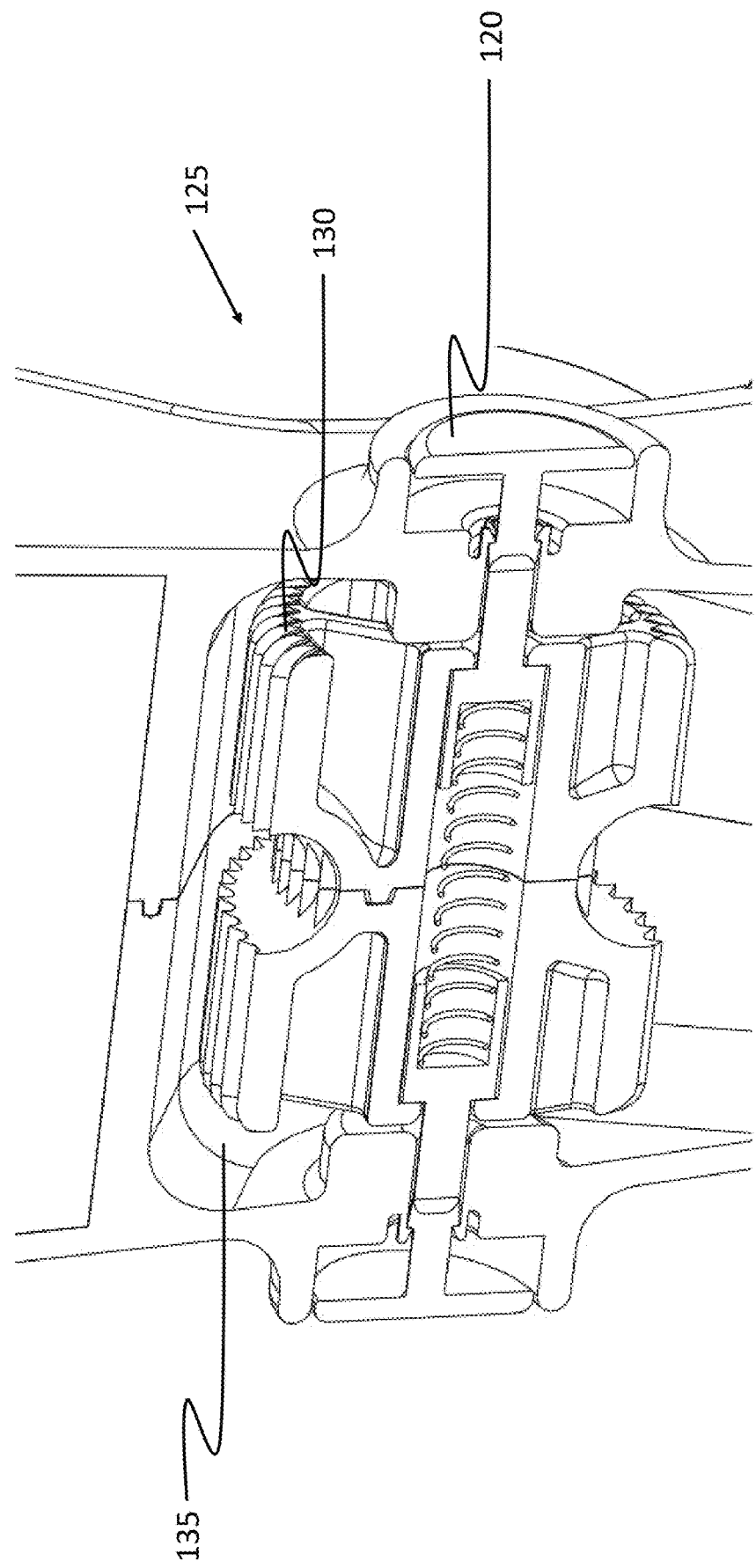
Figure 14:
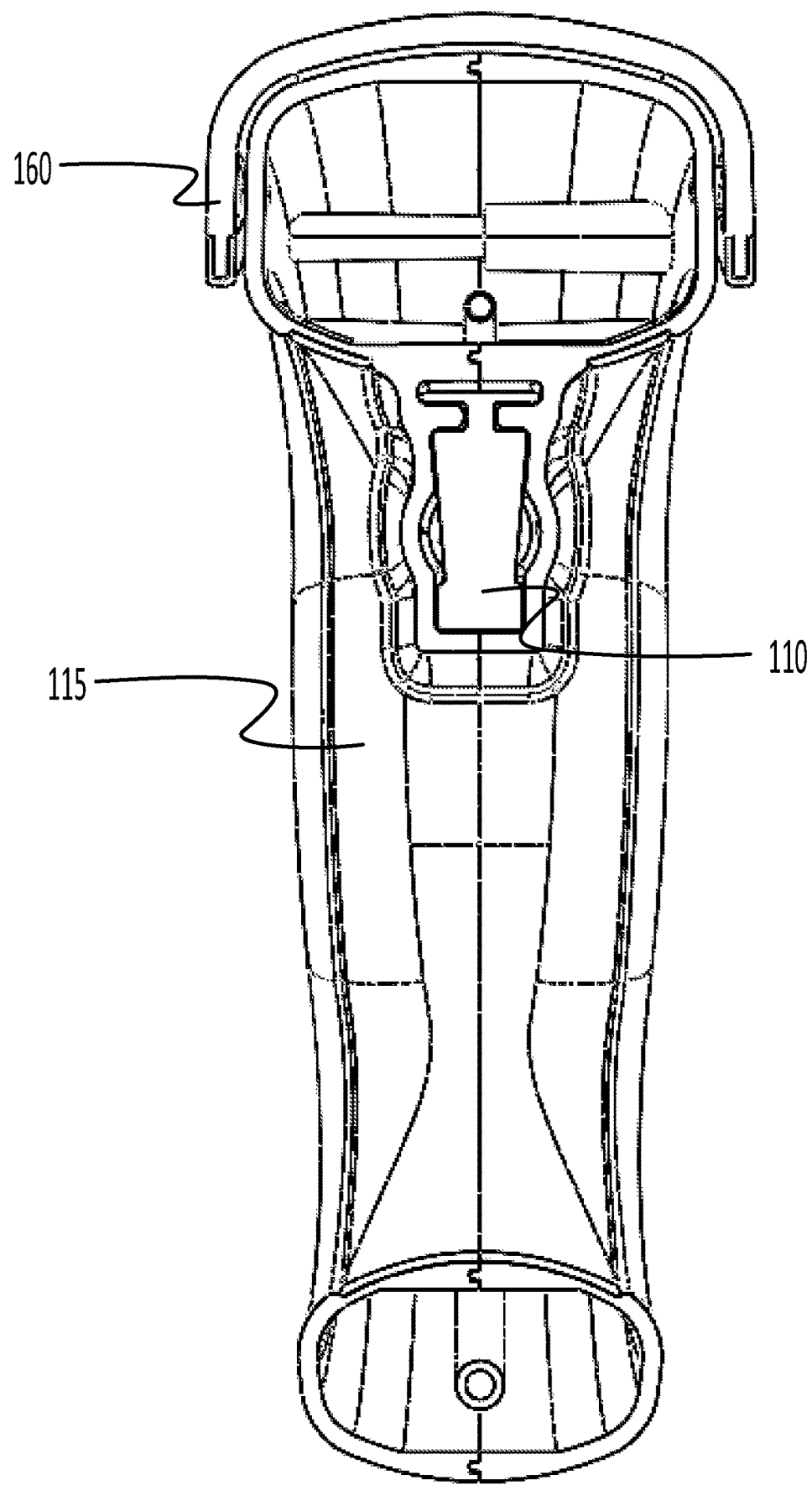
Figure 15:
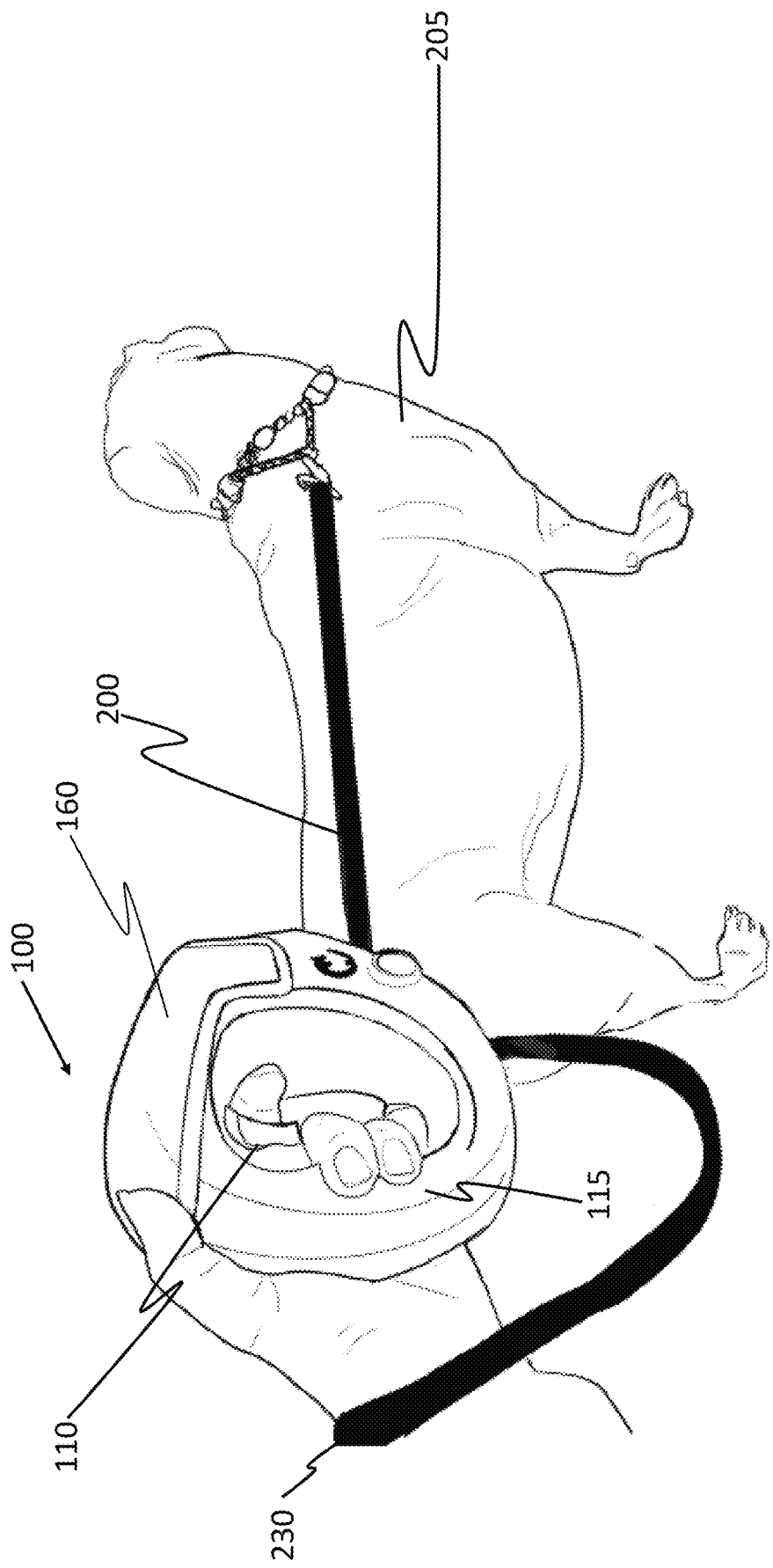
Figure 16:
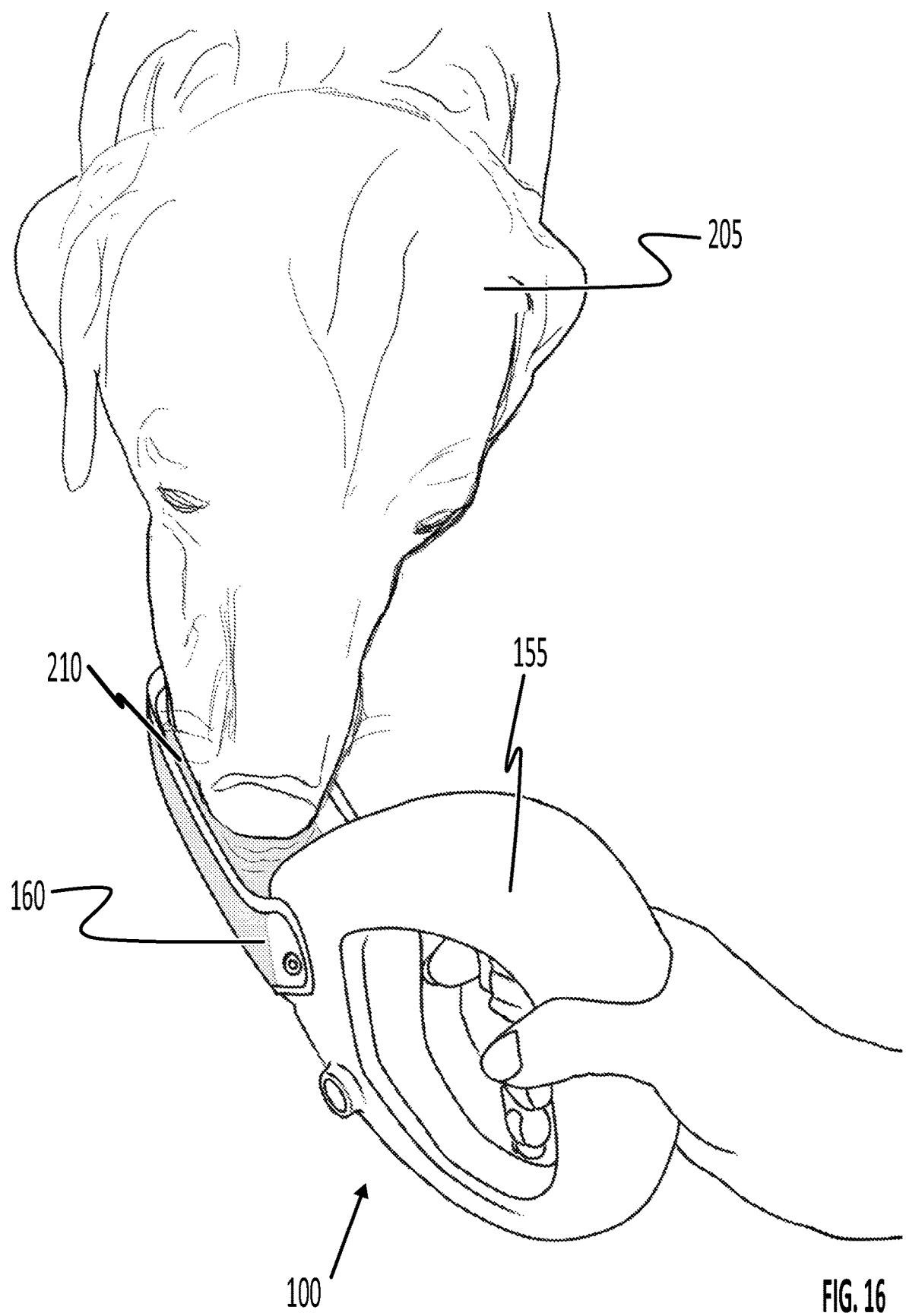
Figure 17:
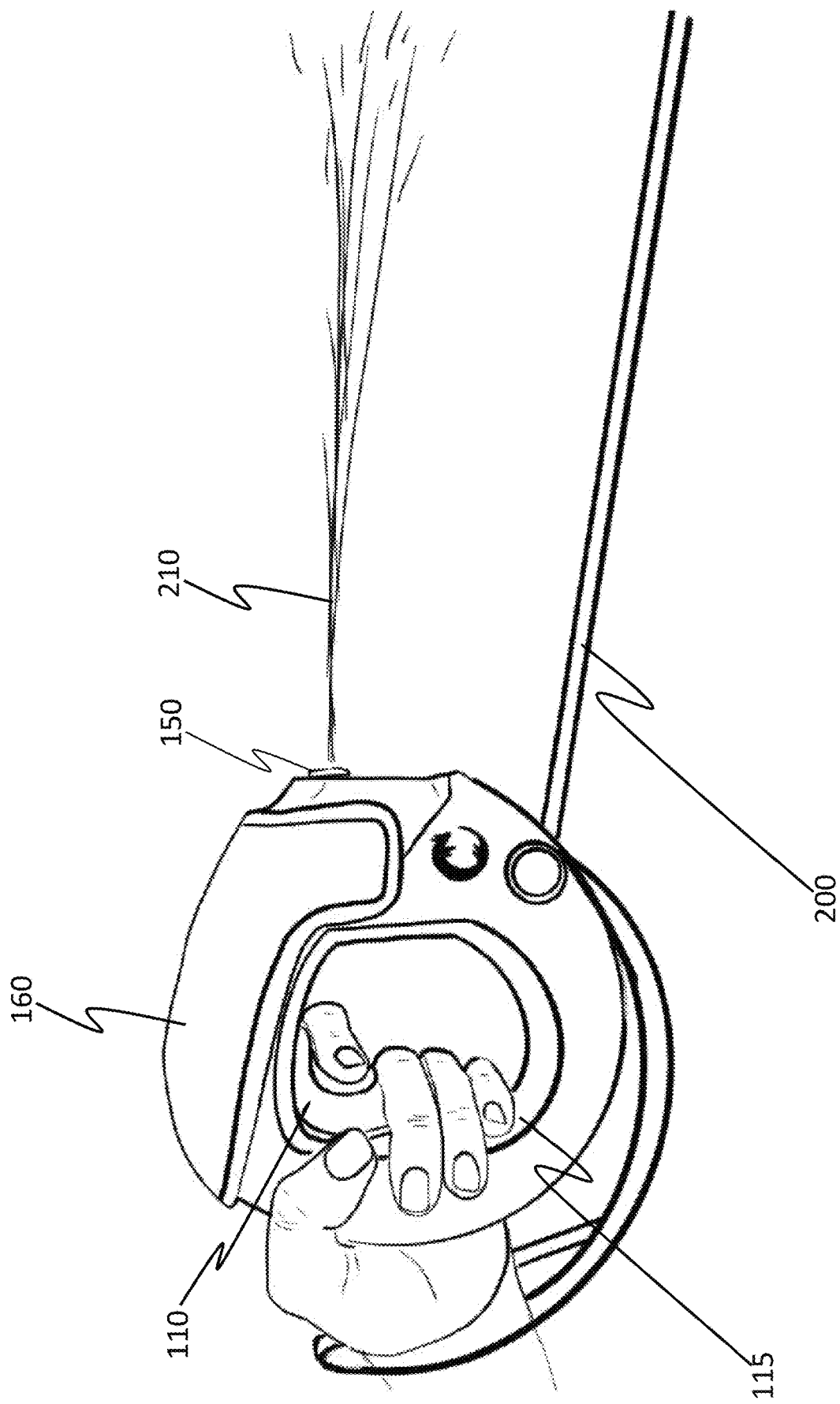
Figure 18:
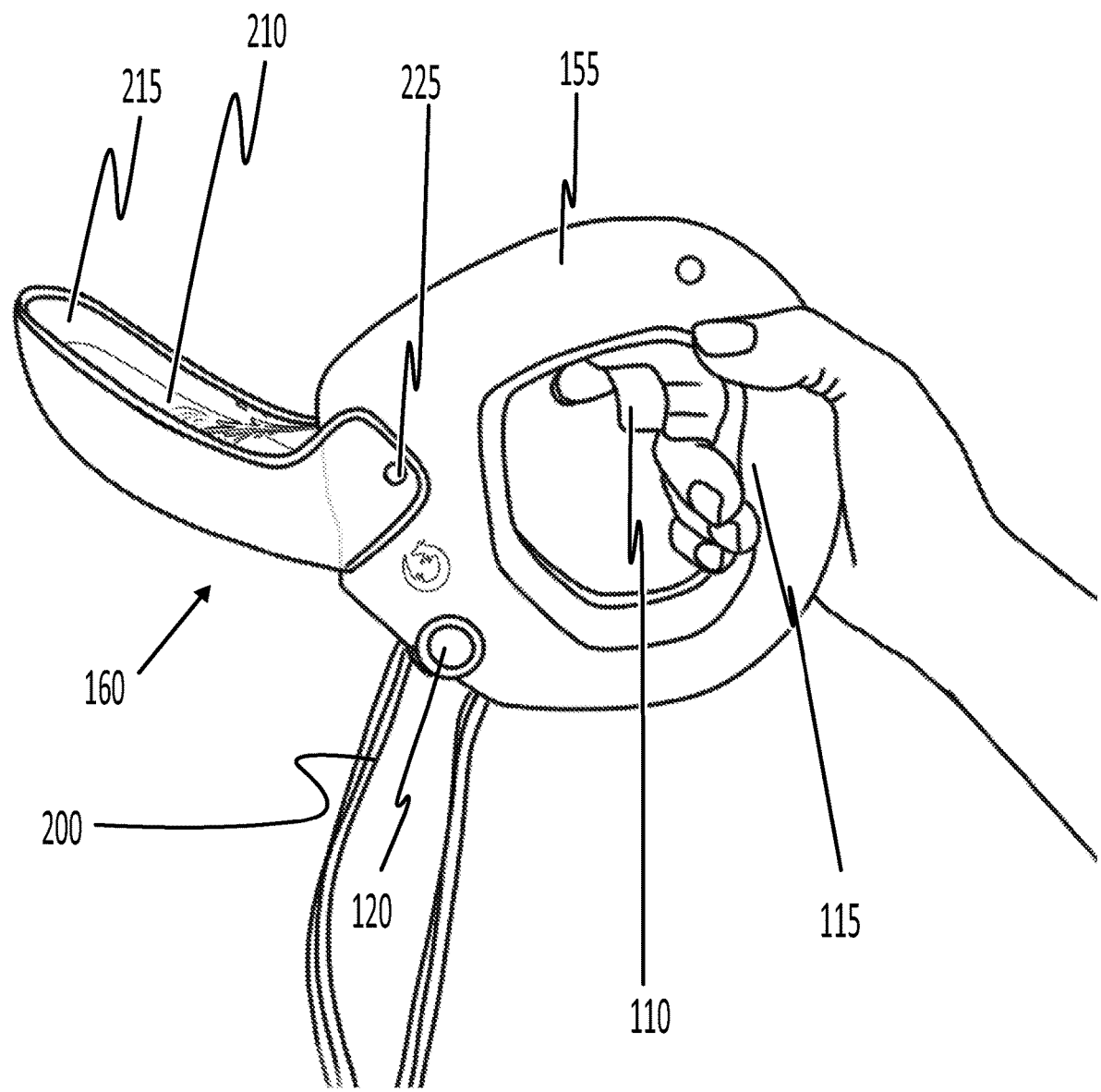
Figure 19:
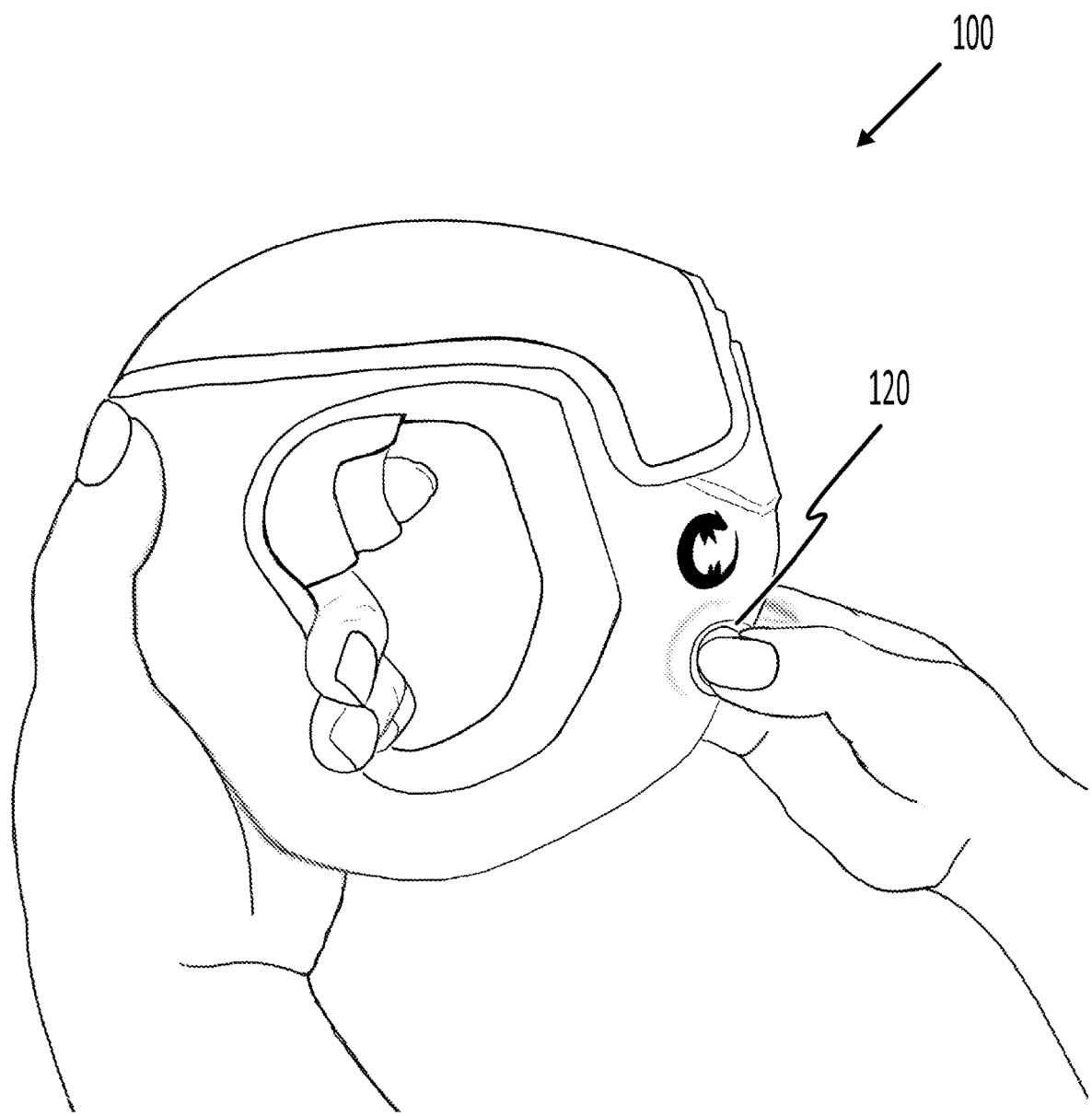
Figure 20:
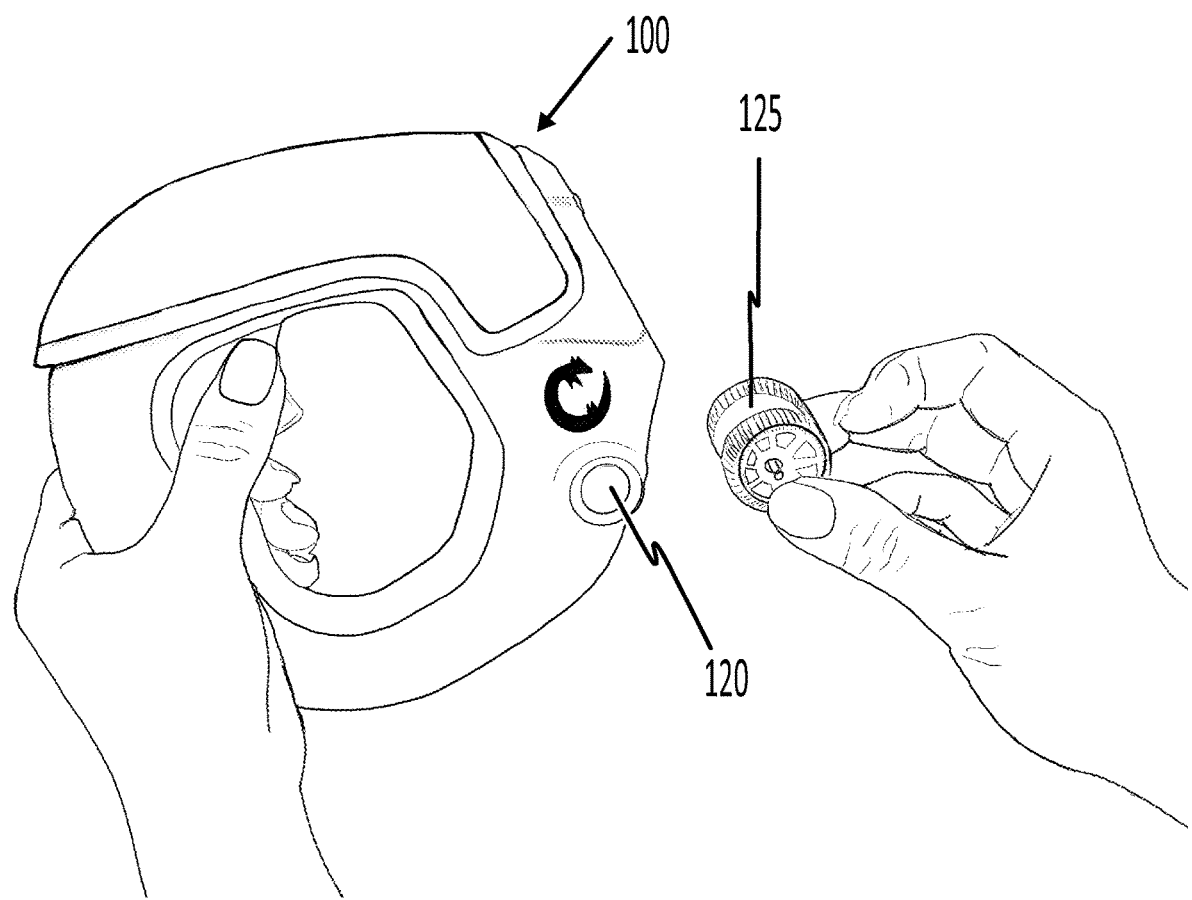
Figure 21:
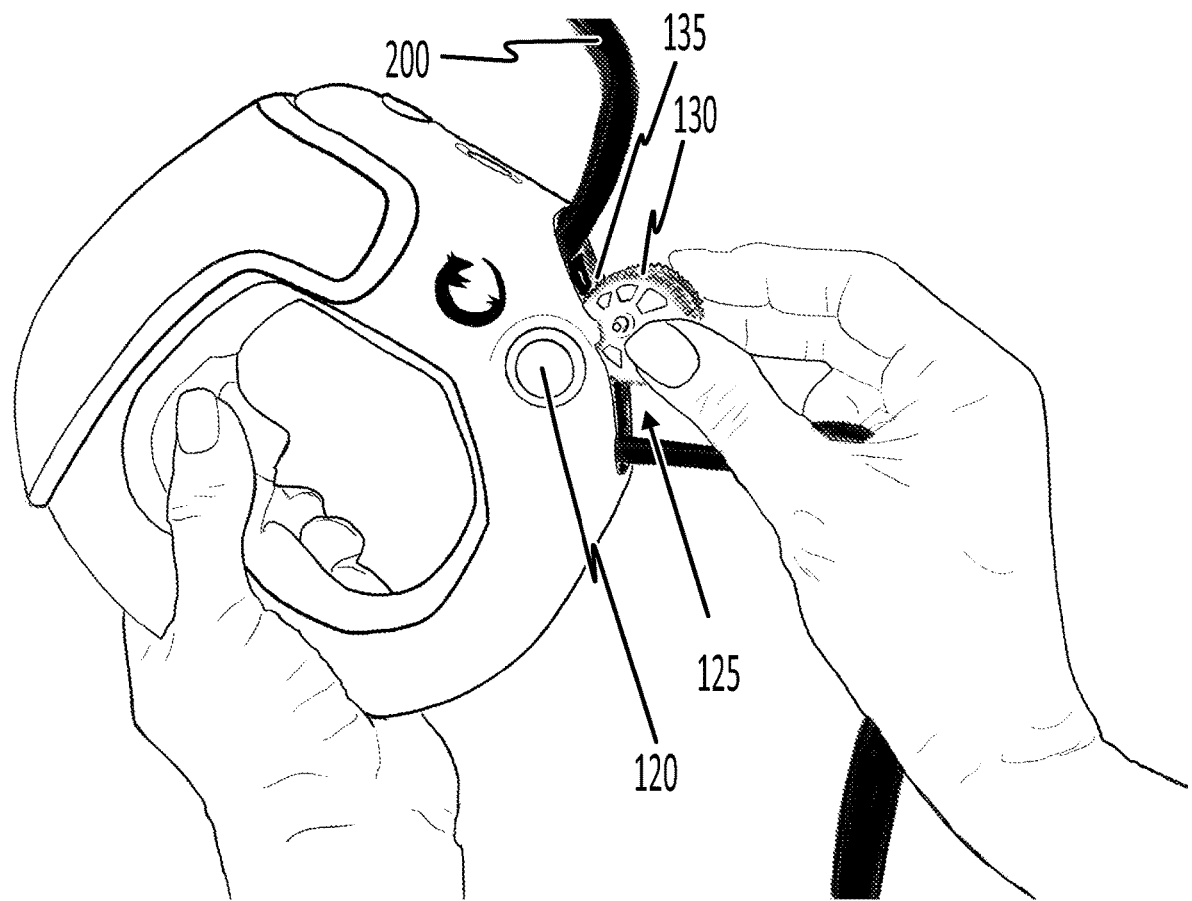
Figure 22:
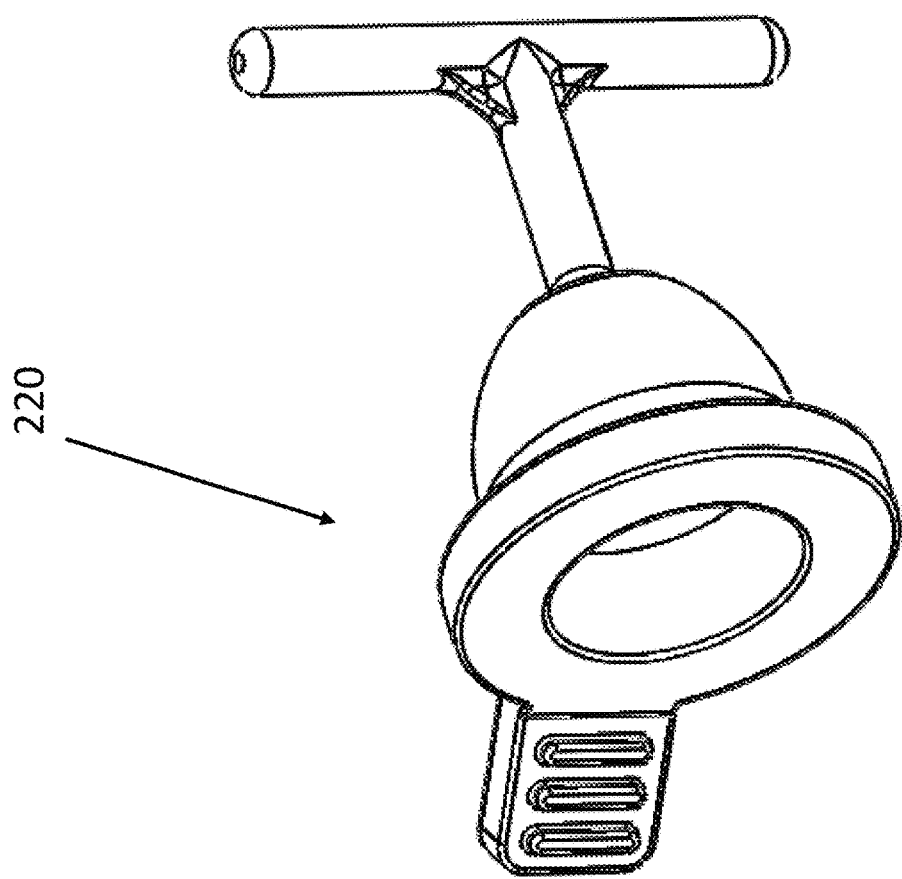
Figure 23:
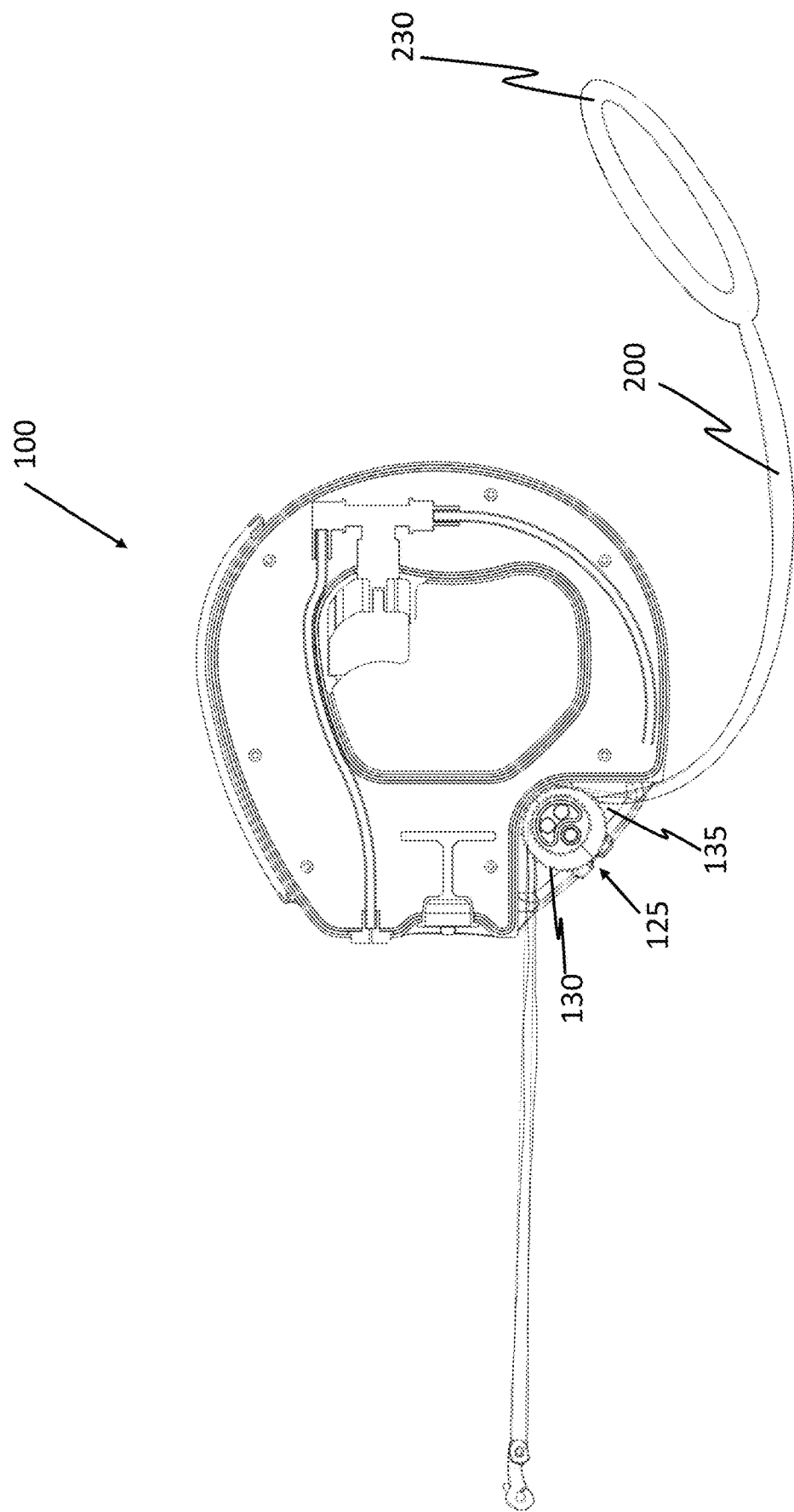
Figure 24:
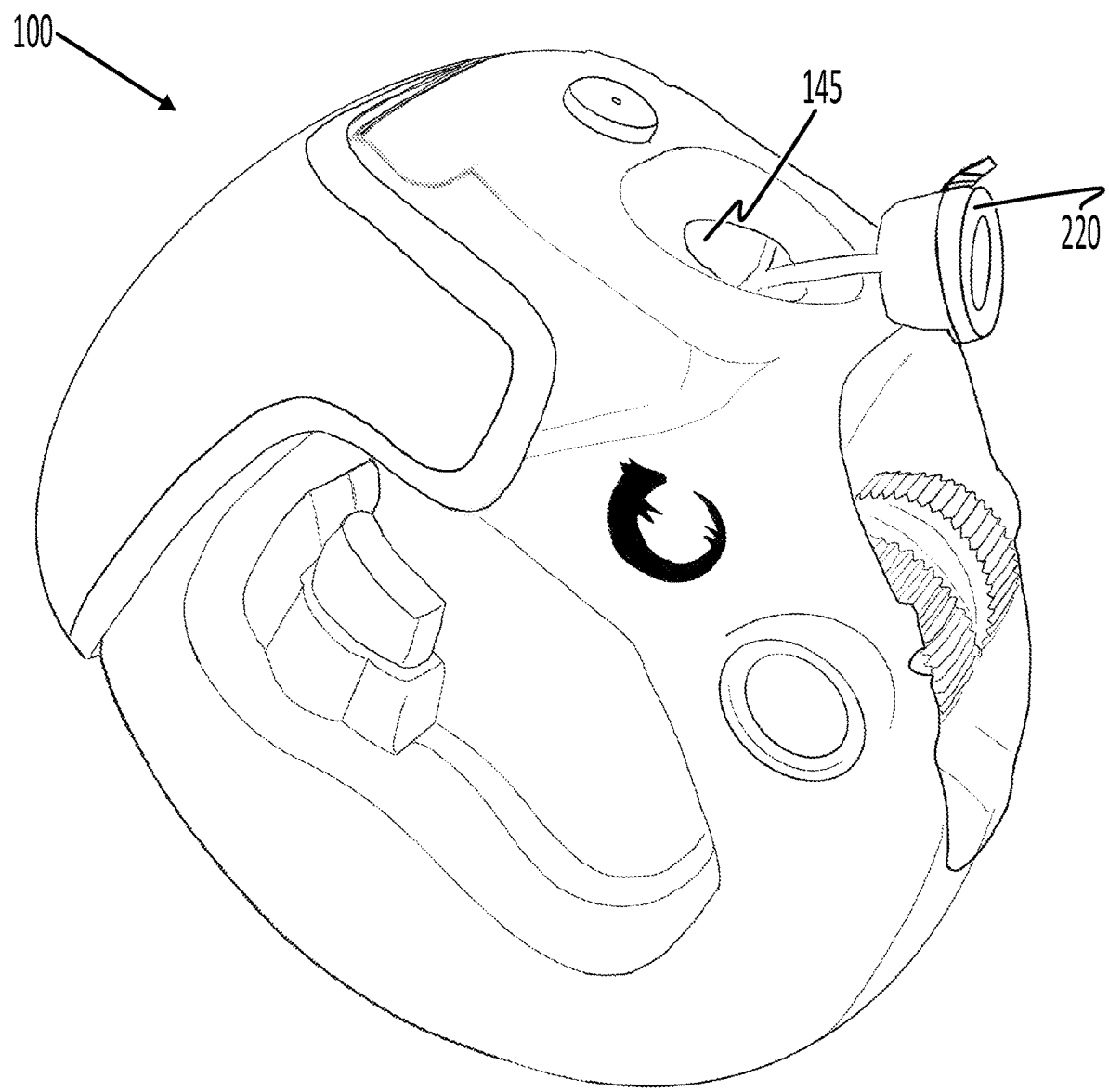
Figure 25:
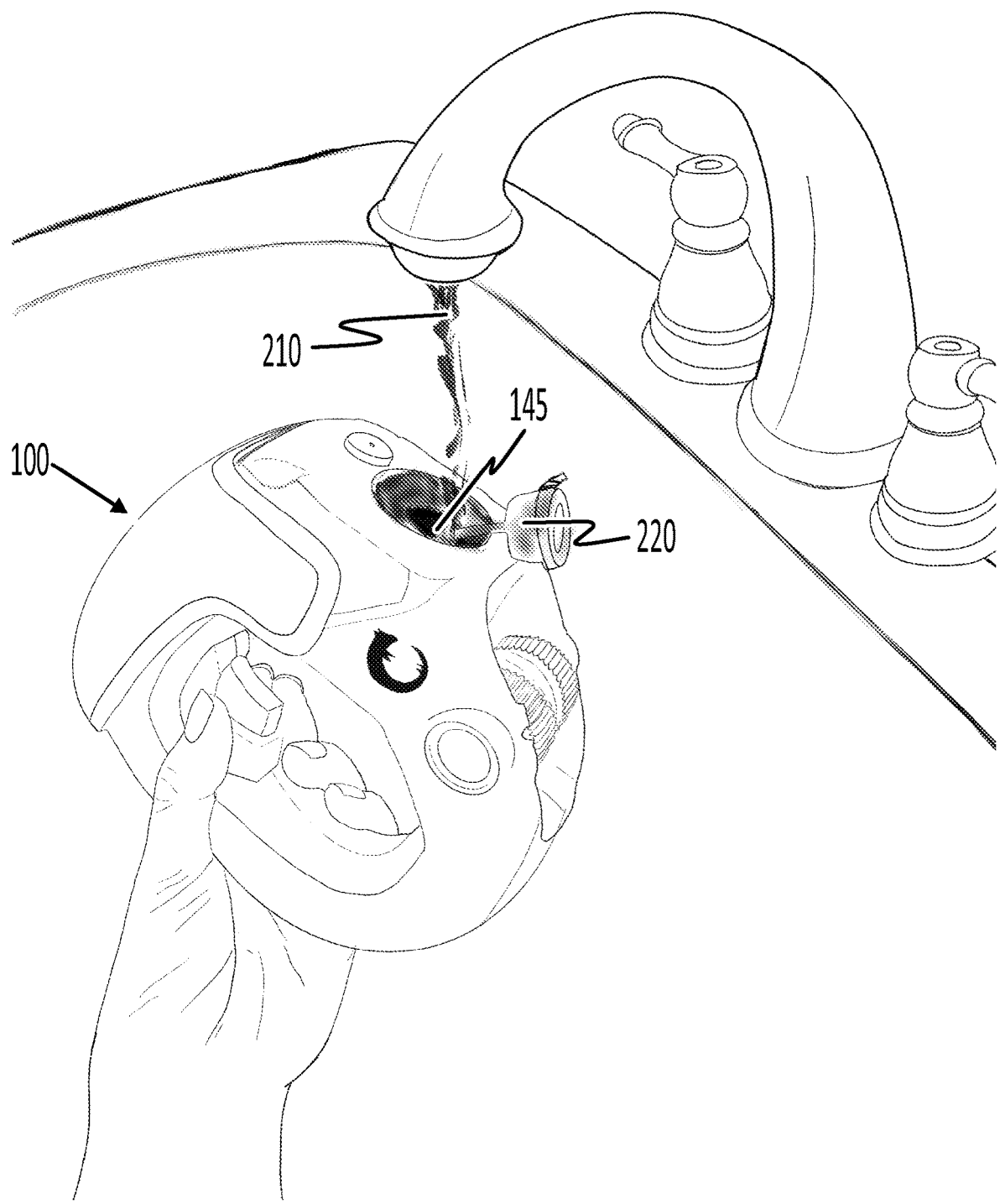

FIG. 1. Perspective view of the leash attachment.
FIG. 2. Side view of the leash attachment.
FIG. 3. Top view of the leash attachment.
FIG. 4. Back view of the leash attachment.
FIG. 5. Front view of the leash attachment.
FIG. 6. Bottom view of the leash attachment.
FIG. 7. Side cross-sectional view of the leash attachment.
FIG. 8. Bottom view of the first pair of detents.
FIG. 9. Perspective cross-sectional view of the funnel.
FIG. 10. Perspective view of the leash attachment with the flip open cup in the open position.
FIG. 11. Side view of the leash attachment with the flip open cup in the open position.
FIG. 12. Bottom view of the cam.
FIG. 13. Perspective cross-sectional view of the cam.
FIG. 14. Front view of the trigger.
FIG. 15. View of a leashed animal being restrained by the leash attachment.
FIG. 16. View of a leashed animal drinking from the flip open cup.
FIG. 17. Side view of the leash attachment expelling liquid from the nozzle.
FIG. 18. Side view of the leash attachment expelling liquid into the flip open cup.
FIG. 19. Side view of the second pair of detents being pushed.
FIG. 20. Side view of the cam being removed from the leash attachment.
FIG. 21. Side view of the cam being placed into the leash attachment to secure the leash.
FIG. 22. Perspective view of the cap.
FIG. 23. Side cross-sectional view of the leash in relation to the cam when the cam is installed in the leash attachment.
FIG. 24. Perspective view of the leash attachment, showing the fill hole.
FIG. 25. Perspective view of the liquid being put into the leash attachment via the fill hole.

DETAILED DESCRIPTION

FIG. 1 refers to a perspective of a leash attachment 100. In this view, a flip open cup 160 is in the closed position, resting on a top surface 155 of a housing 105. The flip open cup 160 is attached to the housing 105. The top surface 155 is angled downward. A trigger 110 is connected to a grip 115; the trigger's deployment releases liquid from a nozzle 150. The grip 115 is for easy handling of the leash attachment 100. A cam 125 is positioned in a leash hole 135, with a second pair of detents 120 keeping the cam 125 in place when there is no leash attached to the leash attachment 100. Ridges 130 are along the outer surface of the cam 125, allowing for a firm and tight connection between a leash and the leash attachment 100. The ridges 130 increase the surface area of the cam 125, increasing the number of connection points between a leash and the cam 125. A funnel 140 is located beneath a fill hole, which is covered by a cap 220. When the flip open cup 160 is in the open position, liquid is expelled into it via the nozzle 150. Liquid that remains in the flip open cup 160, when the cap 220 is removed, can be drained back into the interior of the housing 105 via the funnel 140.

FIG. 2 is a side view of the leash attachment 100, further identifying the housing 105, trigger 110, grip 115, second pair of detents 120, nozzle 150, and flip open cup 160.

FIG. 3 is a top view of the leash attachment 100, further identifying the top surface 155 that the flip open cup 160 rests on when in the closed position. The nozzle 150 is also identifiable.

FIG. 4 is a back view of the leash attachment 100. The second pair of detents 120 are visible, as is the flip open cup 160.

FIG. 5 is a front view of the leash attachment 100. The flip open cup 160 is in the closed position, with the ridges 130 of the cam 125 fully exposed. The funnel 140, cap 220, second pair of detents 120, and nozzle 150 are also clearly visible.

FIG. 6 is a bottom view of the leash attachment 100, with the cam 125, ridges 130, and nozzle 150 are visible.

FIG. 7 is a side cross-sectional view of the leash attachment 100. A dispensing mechanism 165 is within a liquid reservoir 170. The liquid reservoir 170 is within the housing 105. The dispensing mechanism 165, comprising a body 175 and at least one straw 180, is submersible, (i.e. submerged in the liquid held in the liquid reservoir 170). Depressing or deploying the trigger 110, which is connected to the body 175 of the dispensing mechanism 165, causes liquid in contact with one end of the straw 180 (i.e. a first end 185 of the straw 180) to be aspirated through that end of the straw 180, through the body 175 of the dispensing mechanism 165, and out to a second end 190 of a straw 180, which is connected to the nozzle 150. The flip open cup 160 is in the closed position.

FIG. 8 is a view of a first pair of detents 195. The first pair of detents 195, attached to the housing 105, keeps the flip open cup 160 in the closed position. In effect, the first pair of detents 195 keeps the flip open cup 160 from unwantedly swinging open and outward.

FIG. 9 is a perspective view of the funnel 140 and cap 220. When the cap 220 is removed, liquid that is unused drains through the funnel 140 back into the liquid reservoir 170.

FIG. 10 is a perspective view of the leash attachment 100 with the flip open cup 160 in the open position. In the open position, the flip open cup 165 swings outward from the top surface 155. Depressing or deploying the trigger 110 expels liquid from the nozzle 150, which sprays liquid into the flip open cup 160.

FIG. 11 is a side view of the leash attachment 100 with the flip open cup 160 in the open position, swung outward from the top surface 155.

FIG. 12 is a bottom view of the cam 125. The ridges 130 are along the outer surface of the cam 125, with the second pair of detents 120 holding the cam 125 in place. The leash hole 135 surrounds the cam 125 and accommodates leashes.

FIG. 13 is a perspective cross-sectional view of the cam 125, further showing the ridges 130, leash hole 135, and second pair of detents 120.

FIG. 14 is a front cross-sectional view of the trigger 110. The trigger 110 is attached to the grip 115. The flip open cup 160 is in the closed position.

FIG. 15 is a view of the leash attachment 110 being held by a user, with a leash 200 connected to the leash attachment 100. The user's index finger holds the trigger 110, with the remaining fingers holding the grip 115. The thumb is positioned on the back of the housing 105. One end of the leash 200 is around the wrist of the user, while the other end of the leash 200 is attached to a leashed animal 205. The flip open cup 160 is in the closed position. The leash attachment 100 is positioned at least 4 inches and at most 8 inches from a proximal end 230 of the leash 200.

FIG. 16 is a view of a user holding the leash attachment 100, with a leashed animal 205 drinking liquid 210 from the flip open cup 160. With the flip open cup 160 swung outward from the top surface 155, the leashed animal 205 may drink liquid 210 expelled from the nozzle 150.

FIG. 17 is a side view of liquid 210 being expelled from the nozzle 150. The user is holding the trigger 110 with the index finger and the grip 115 with the remaining fingers. The leash 200 is around the user's wrist. The flip open cup 160 is in the closed position.

FIG. 18 is a side view of liquid 210 being expelled from the nozzle 150 into the distal end 215 of the flip open cup 160. The liquid 210 is directed towards the distal end 215 when the flip open cup 160 is in the open position so that the liquid 210 falls down and settles into the flip open cup 160. The flip open cup 160 is in the open position, not resting on the top surface 155. The leash 200 travels around the outer surface of the cam 125, with the second pair of detents 120 securing the cam 125. The user is holding the trigger 110 with the index finger and the grip 115 with the remaining fingers. A locating pin 225 allows for easy assembly of the flip open cup 160 onto the leash attachment 100. The locating pin 225 also allows the flip open cup 160 to be swung into the open position.

FIGS. 19 and 20 show the removal of the cam 125 from the leash attachment 100. In FIG. 19, a user presses the second pair of detents 190. FIG. 20 shows the removal of the cam 125 from the leash attachment 100 due to pressing the second pair of detents 190.

FIG. 21 shows the placement of the cam 125 within the leash attachment to secure the leash 200. A user can place the cam 125 within the leash hole 135 and between the second pair of detents 190 so that the leash 200 rolls along the ridges 130 of the cam 125. The cam 125 is characterized as a rolling structure whereby the leash 200 rolls along the ridges 130 of the cam 125, securing the leash 200 in place.

FIG. 22 is a perspective view of a cap 220. The cap 220 covers the fill hole 145 to ensure that liquid does not leak from the leash attachment 100. The cap 220 is tethered to fill hole 145.

FIG. 23 is a side cross-sectional view of the leash attachment 100, with the leash 200 along the outer surface of the cam 125. The cam exists within the leash hole 135. The leash 200 rolls along the ridges 130 of the cam 125. Once the cam 125 is in place, the leash 200 is secured.

FIG. 24 is a perspective view of the leash attachment 100, with the fill hole 145 visible. When the leash attachment 100 is in use, the cap 220 would be plugged into the fill hole 145. When the cap 220 is not plugged into the fill hole 145, the cap 220 is tethered to the fill hole 145.

FIG. 25 is a perspective view of liquid 210 being deposited into the leash attachment 100 by way of the fill hole 145. The cap 220 is removed, allowing liquid 210 to enter the fill hole 145. When the cap 220 plugs the fill hole 145, liquid 210 does not leak from the leash attachment 100.

Other Embodiments

In another embodiment, the cam runs freely along a cam track, securing the leash. Also in this embodiment, the liquid reservoir is lined by a gasket, which keeps liquid from leaking from the liquid reservoir. A thin rubberized tether attaches to the cap and cam to prevent loss. In this same embodiment, the body of the dispensing mechanism may also accommodate one straw that enters the body of the dispensing mechanism at its bottom and exits at the top. The portion of the straw that enters the body of the dispensing mechanism via the bottom of the dispensing mechanism has a free end that is in contact with the liquid. The portion of the straw that exits the top of the body of the dispensing mechanism has an end that is connected to the nozzle. The leash attachment has a level indicator to let the animal owner know how much liquid is in the liquid reservoir. In addition, the liquid that exits the nozzle can exit as a spray or a stream, depending on the nozzle's setting, with the option of pouring liquid from the liquid reservoir directly into the cup, bypassing the nozzle.

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. A leash attachment comprising:
A housing; a trigger; a cam; a fill hole; a liquid reservoir; a flip open cup; a dispensing mechanism; a grip; and a leash hole.

2. The leash attachment of claim 1, wherein the dispensing mechanism further comprises a body and at least one straw, and wherein the dispensing mechanism is submersible within the liquid reservoir.

3. The leash attachment of claim 2, wherein a first pair of detents keeps the flip open cup in a closed position; and wherein a second pair of detents keeps the cam in place and secures a leash.

4. The leash attachment of claim 3, wherein the flip open cup rests on a top surface when in a closed position; and wherein the flip open cup swings outward to be in an open position, allowing a liquid to be expelled from a nozzle into the flip open cup.

5. The leash attachment of claim 4, wherein the top surface is angled downward.

6. The leash attachment of claim 5, wherein a leash enters and exits through the leash hole; and wherein the cam secures the leash.

7. The leash attachment of claim 6, wherein the trigger is connected to the dispensing mechanism, and wherein the liquid is aspirated when the trigger is deployed through the at least one straw at a first end and to a second end connected to the nozzle.

8. The leash attachment of claim 7, wherein the liquid enters the liquid reservoir through the fill hole.

9. The leash attachment of claim 8, wherein the nozzle expels liquid towards a distal end of the flip open cup when the flip open cup is in the open position.

10. The leash attachment of claim 1, wherein the cam is a rolling structure, with the leash rolling along ridges of the cam.

11. The leash attachment of claim 1, wherein a cap covers the fill hole.

12. The leash attachment of claim 1, further comprising a funnel.

13. The leash attachment of claim 1, further comprising a locating pin.

14. A leash attachment comprising:
A housing; a trigger; a cam; a fill hole; a liquid reservoir; a flip open cup; a dispensing mechanism; a leash hole; a first pair of detents; and a second pair of detents; wherein the dispensing mechanism further comprises a body and at least one straw and is submersible within the liquid reservoir; the housing further comprises a grip; the first pair of detents keeps the flip open cup in a closed position and the second pair of detents keeps the cam in place when a leash is not attached and releases the cam from the leash attachment when pressed; the cam is a rolling structure with the leash rolling along ridges of the cam; the flip open cup rests on a top surface when in a closed position; the top surface is downwardly angled; the flip open cup swings outward to be in an open position, allowing a liquid to be expelled from a nozzle into the flip open cup; the leash enters and exits through the leash hole; the cam secures the leash; the trigger is connected to the dispensing mechanism; the liquid is aspirated from a first end of the at least one straw to a second end of the at least one straw connected to the nozzle; the liquid exits the nozzle when the trigger is deployed; the liquid enters the housing through the fill hole; the nozzle expels liquid towards a distal end of the flip open cup when the flip open cup is in the open position; a cap covers the fill hole; a locating pin allows for easy assembly of the flip open cup onto the leash attachment and for the flip open cup to be swung into the open position; and wherein a funnel drains unused liquid back through the fill hole into the liquid reservoir from the flip open cup.

15. A method of using a leash attachment to provide a liquid to a leashed animal, comprising the steps of: providing the leash attachment comprising: a housing, a trigger, a cam, a fill hole, a liquid reservoir, a flip open cup, a dispensing mechanism, a leash hole, a first pair of detents, and a second pair of detents; placing a leash through the leash hole; securing the leash with the cam and allowing the leash to roll along ridges of the cam; filling the liquid reservoir with a liquid through the fill hole; placing a cap on the fill hole; swinging the flip open cup outward from a top surface that is downwardly angled into an open position; depressing the trigger so that the dispensing mechanism via a nozzle expels the liquid towards a distal end of the flip open cup; and returning the flip open cup to a closed position.

16. The method of claim 15, wherein the dispensing mechanism is submersible within the liquid reservoir.

17. The method of claim 16, wherein unused liquid is directed via a funnel back through the fill hole into the liquid reservoir, with the funnel positioned beneath the fill hole.

18. The method of claim 17, wherein a locating pin allows the flip open cup to swing outward into the open position.

19. The method of claim 18, wherein the first pair of detents keeps the flip open cup in a closed position; and the second pair of detents, when pressed, releases the cam from the leash attachment.

* * * * *